(12) United States Patent
Skiff et al.

(10) Patent No.: US 10,133,621 B1
(45) Date of Patent: Nov. 20, 2018

(54) DATA ANALYSIS SYSTEM TO FACILITATE INVESTIGATIVE PROCESS

(71) Applicant: Palantir Technologies Inc., Palo Alto, CA (US)

(72) Inventors: David Skiff, Redwood City, CA (US); Allen Cai, Menlo Park, CA (US); Benjamin Lee, Palo Alto, CA (US); Christopher Yu, Culver City, CA (US); Hind Kraytem, London (GB); Jason Ma, Palo Alto, CA (US); Myles Scolnick, Englewood, CO (US); Tarik Benabdallah, Paris (FR); Zhixian Shen, New York, NY (US)

(73) Assignee: Palantir Technologies Inc., Palo Alto, CA (US)

( * ) Notice: Subject to any disclaimer, the term of this patent is extended or adjusted under 35 U.S.C. 154(b) by 0 days.

(21) Appl. No.: 15/654,417

(22) Filed: Jul. 19, 2017

Related U.S. Application Data

(60) Provisional application No. 62/447,760, filed on Jan. 18, 2017.

(51) Int. Cl.
*G06F 11/00* (2006.01)
*G06F 11/07* (2006.01)
(Continued)

(52) U.S. Cl.
CPC ............ *G06F 11/079* (2013.01); *H04L 67/22* (2013.01); *G06F 17/30023* (2013.01);
(Continued)

(58) Field of Classification Search
CPC .................................................... G06F 11/079
(Continued)

(56) References Cited

U.S. PATENT DOCUMENTS

| 5,515,488 A | 5/1996 | Hoppe et al. |
| 5,974,572 A * | 10/1999 | Weinberg ................ G06F 11/32 |
| | | 707/E17.116 |

(Continued)

FOREIGN PATENT DOCUMENTS

| CN | 102546446 A | 7/2012 |
| CN | 103167093 A | 6/2013 |

(Continued)

OTHER PUBLICATIONS

"5 Great Tools for Visualizing your Twitter Followers", Amnet Blog, http://www.amnetblog.com/component/content/article/115-5-great-tools-for-visualizing-your-twitter-followers.html, (Aug. 4, 2010), 1-5.

(Continued)

*Primary Examiner* — Dieu Minh T Le
(74) *Attorney, Agent, or Firm* — Schwegman Lundberg & Woessner, P.A.

(57) ABSTRACT

Disclosed are data gathering and analysis systems, methods, and computer-readable storage media to facilitate an investigation process. The method includes accessing a data object representing an investigative issue. The method further includes causing presentation, on a display of a device, of a user interface configured to receive user search queries and present search results for each received search query. The method further includes tracking user activity including one or more user actions performed as part of an investigation of the investigatory issue, the one or more user actions including user interactions with the user interface. The method further includes creating a record of the user activity involving the investigatory issue, and linking the record of the user activity with the data object representing the investigative issue.

16 Claims, 15 Drawing Sheets

(51) Int. Cl.
*H04L 29/08* (2006.01)
*H04L 12/24* (2006.01)
*G06F 17/30* (2006.01)

(52) U.S. Cl.
CPC .... *G06F 17/30038* (2013.01); *H04L 41/0631* (2013.01); *H04L 67/306* (2013.01)

(58) Field of Classification Search
USPC .............................. 714/31, 32, 33, 46, 47.1
See application file for complete search history.

(56) References Cited

U.S. PATENT DOCUMENTS

| | | |
|---|---|---|
| 6,430,305 B1 | 8/2002 | Decker |
| 6,820,135 B1 | 11/2004 | Dingman et al. |
| 6,978,419 B1 | 12/2005 | Kantrowitz |
| 6,980,984 B1 | 12/2005 | Huffman et al. |
| 7,168,039 B2 | 1/2007 | Bertram |
| 7,461,077 B1 | 12/2008 | Greenwood et al. |
| 7,617,232 B2 | 11/2009 | Gabbert et al. |
| 7,756,843 B1 | 7/2010 | Palmer |
| 7,899,796 B1 | 3/2011 | Borthwick et al. |
| 7,917,376 B2 | 3/2011 | Bellin et al. |
| 7,941,321 B2 | 5/2011 | Greenstein et al. |
| 7,991,764 B2 * | 8/2011 | Rathod ............. G06F 17/30867 707/640 |
| 8,036,971 B2 | 10/2011 | Aymeloglu et al. |
| 8,037,046 B2 | 10/2011 | Udezue et al. |
| 8,046,283 B2 | 10/2011 | Burns et al. |
| 8,054,756 B2 | 11/2011 | Chand et al. |
| 8,214,490 B1 | 7/2012 | Vos et al. |
| 8,229,902 B2 | 7/2012 | Vishniac et al. |
| 8,290,838 B1 | 10/2012 | Thakur et al. |
| 8,302,855 B2 | 11/2012 | Ma et al. |
| 8,386,377 B1 | 2/2013 | Xiong et al. |
| 8,473,454 B2 | 6/2013 | Evanitsky et al. |
| 8,484,115 B2 | 7/2013 | Aymeloglu et al. |
| 8,489,641 B1 | 7/2013 | Seefeld et al. |
| 8,577,911 B1 | 11/2013 | Stepinski et al. |
| 8,589,273 B2 | 11/2013 | Creeden et al. |
| 8,688,573 B1 | 4/2014 | Rukonic et al. |
| 8,744,890 B1 | 6/2014 | Bernier et al. |
| 8,799,799 B1 | 8/2014 | Cervelli et al. |
| 8,806,355 B2 | 8/2014 | Twiss et al. |
| 8,812,960 B1 | 8/2014 | Sun et al. |
| 8,924,388 B2 | 12/2014 | Elliot et al. |
| 8,924,389 B2 | 12/2014 | Elliot et al. |
| 8,938,686 B1 | 1/2015 | Erenrich et al. |
| 8,949,164 B1 | 2/2015 | Mohler |
| 9,069,842 B2 | 6/2015 | Melby |
| 9,100,428 B1 | 8/2015 | Visbal |
| 9,111,281 B2 | 8/2015 | Stibel et al. |
| 9,129,219 B1 | 9/2015 | Robertson et al. |
| 9,256,664 B2 | 2/2016 | Chakerian et al. |
| 9,280,618 B1 | 3/2016 | Bruce et al. |
| 9,286,373 B2 | 3/2016 | Elliot et al. |
| 9,335,911 B1 | 5/2016 | Elliot et al. |
| 2002/0065708 A1 | 5/2002 | Senay et al. |
| 2002/0095360 A1 | 7/2002 | Joao |
| 2002/0095658 A1 | 7/2002 | Shulman et al. |
| 2002/0103705 A1 | 8/2002 | Brady |
| 2002/0147805 A1 | 10/2002 | Leshem et al. |
| 2003/0126102 A1 | 7/2003 | Borthwick |
| 2004/0034570 A1 | 2/2004 | Davis |
| 2004/0111480 A1 | 6/2004 | Yue |
| 2004/0153418 A1 | 8/2004 | Hanweck |
| 2004/0236688 A1 | 11/2004 | Bozeman |
| 2005/0010472 A1 | 1/2005 | Quatse et al. |
| 2005/0086207 A1 | 4/2005 | Heuer et al. |
| 2005/0154628 A1 | 7/2005 | Eckart et al. |
| 2005/0154769 A1 | 7/2005 | Eckart et al. |
| 2006/0026120 A1 | 2/2006 | Carolan et al. |
| 2006/0026170 A1 | 2/2006 | Kreitler et al. |
| 2006/0080283 A1 | 4/2006 | Shipman |
| 2006/0143034 A1 | 6/2006 | Rothermel et al. |
| 2006/0143075 A1 | 6/2006 | Carr et al. |
| 2006/0143079 A1 | 6/2006 | Basak et al. |
| 2007/0000999 A1 | 1/2007 | Kubo et al. |
| 2007/0011304 A1 | 1/2007 | Error |
| 2007/0038646 A1 | 2/2007 | Thota |
| 2007/0150801 A1 | 6/2007 | Chidlovskii et al. |
| 2007/0156673 A1 | 7/2007 | Maga et al. |
| 2007/0162454 A1 | 7/2007 | D'Albora et al. |
| 2007/0185867 A1 | 8/2007 | Maga et al. |
| 2007/0192122 A1 | 8/2007 | Routson et al. |
| 2007/0284433 A1 | 12/2007 | Domenica et al. |
| 2008/0065655 A1 | 3/2008 | Chakravarthy et al. |
| 2008/0069081 A1 | 3/2008 | Chand et al. |
| 2008/0077642 A1 | 3/2008 | Carbone et al. |
| 2008/0103996 A1 | 5/2008 | Forman et al. |
| 2008/0208735 A1 | 8/2008 | Balet et al. |
| 2008/0222295 A1 | 9/2008 | Robinson et al. |
| 2008/0243711 A1 | 10/2008 | Aymeloglu et al. |
| 2008/0255973 A1 | 10/2008 | El Wade et al. |
| 2008/0270328 A1 | 10/2008 | Lafferty et al. |
| 2008/0294663 A1 | 11/2008 | Heinley et al. |
| 2008/0313132 A1 | 12/2008 | Hao et al. |
| 2009/0076845 A1 | 3/2009 | Bellin et al. |
| 2009/0094166 A1 | 4/2009 | Aymeloglu et al. |
| 2009/0094270 A1 | 4/2009 | Alirez et al. |
| 2009/0106178 A1 | 4/2009 | Chu |
| 2009/0112745 A1 | 4/2009 | Stefanescu |
| 2009/0125359 A1 | 5/2009 | Knapic et al. |
| 2009/0125459 A1 | 5/2009 | Norton et al. |
| 2009/0132953 A1 | 5/2009 | Reed, Jr. et al. |
| 2009/0157732 A1 | 6/2009 | Hao et al. |
| 2009/0187546 A1 | 7/2009 | Whyte |
| 2009/0187548 A1 | 7/2009 | Ji et al. |
| 2009/0249244 A1 | 10/2009 | Robinson et al. |
| 2009/0254842 A1 | 10/2009 | Leacock et al. |
| 2009/0259636 A1 | 10/2009 | Labrou et al. |
| 2009/0271343 A1 | 10/2009 | Vaiciulis et al. |
| 2009/0307049 A1 | 12/2009 | Elliott, Jr. et al. |
| 2009/0313463 A1 | 12/2009 | Pang et al. |
| 2009/0319418 A1 | 12/2009 | Herz |
| 2009/0319515 A1 | 12/2009 | Minton et al. |
| 2009/0319891 A1 | 12/2009 | MacKinlay et al. |
| 2010/0030722 A1 | 2/2010 | Goodson et al. |
| 2010/0031141 A1 | 2/2010 | Summers et al. |
| 2010/0042922 A1 | 2/2010 | Bradateanu et al. |
| 2010/0057622 A1 | 3/2010 | Faith |
| 2010/0070842 A1 | 3/2010 | Aymeloglu et al. |
| 2010/0098318 A1 | 4/2010 | Anderson |
| 2010/0106752 A1 | 4/2010 | Eckardt, III et al. |
| 2010/0114887 A1 | 5/2010 | Conway et al. |
| 2010/0131502 A1 | 5/2010 | Fordham |
| 2010/0161735 A1 | 6/2010 | Sharma |
| 2010/0191563 A1 | 7/2010 | Schlaifer et al. |
| 2010/0211535 A1 | 8/2010 | Rosenberger |
| 2010/0235915 A1 | 9/2010 | Memon et al. |
| 2010/0262688 A1 | 10/2010 | Hussain et al. |
| 2010/0293174 A1 | 11/2010 | Bennett |
| 2010/0312837 A1 | 12/2010 | Bodapati et al. |
| 2011/0040776 A1 | 2/2011 | Najm et al. |
| 2011/0061013 A1 | 3/2011 | Bilicki et al. |
| 2011/0078173 A1 | 3/2011 | Seligmann et al. |
| 2011/0093327 A1 | 4/2011 | Fordyce, III et al. |
| 2011/0099133 A1 | 4/2011 | Chang et al. |
| 2011/0153384 A1 | 6/2011 | Horne et al. |
| 2011/0173093 A1 | 7/2011 | Psota et al. |
| 2011/0208565 A1 | 8/2011 | Ross et al. |
| 2011/0208724 A1 | 8/2011 | Jones et al. |
| 2011/0213655 A1 | 9/2011 | Henkin et al. |
| 2011/0218955 A1 | 9/2011 | Tang et al. |
| 2011/0270604 A1 | 11/2011 | Qi et al. |
| 2011/0270834 A1 | 11/2011 | Sokolan et al. |
| 2011/0276396 A1 * | 11/2011 | Rathod ............. G06F 17/30867 705/14.49 |
| 2011/0289397 A1 | 11/2011 | Eastmond et al. |
| 2011/0295649 A1 | 12/2011 | Fine et al. |
| 2011/0314007 A1 | 12/2011 | Dassa et al. |
| 2011/0314024 A1 | 12/2011 | Chang et al. |
| 2012/0004904 A1 | 1/2012 | Shin et al. |
| 2012/0011238 A1 | 1/2012 | Rathod |

(56) References Cited

U.S. PATENT DOCUMENTS

| | | |
|---|---|---|
| 2012/0011245 A1 | 1/2012 | Gillette et al. |
| 2012/0022945 A1 | 1/2012 | Falkenborg et al. |
| 2012/0054284 A1 | 3/2012 | Rakshit |
| 2012/0059853 A1 | 3/2012 | Jagota |
| 2012/0066166 A1 | 3/2012 | Curbera et al. |
| 2012/0079363 A1 | 3/2012 | Folting et al. |
| 2012/0084117 A1 | 4/2012 | Tavares et al. |
| 2012/0084287 A1 | 4/2012 | Lakshminarayan et al. |
| 2012/0089606 A1 | 4/2012 | Eshwar et al. |
| 2012/0131512 A1 | 5/2012 | Takeuchi et al. |
| 2012/0144335 A1 | 6/2012 | Abeln et al. |
| 2012/0158527 A1 | 6/2012 | Cannelongo et al. |
| 2012/0159362 A1 | 6/2012 | Brown et al. |
| 2012/0173381 A1 | 7/2012 | Smith |
| 2012/0215784 A1 | 8/2012 | King et al. |
| 2012/0221553 A1 | 8/2012 | Wittmer et al. |
| 2012/0226523 A1 | 9/2012 | Weiss et al. |
| 2012/0245976 A1 | 9/2012 | Kumar et al. |
| 2012/0323888 A1 | 12/2012 | Osann, Jr. |
| 2013/0016106 A1 | 1/2013 | Yip et al. |
| 2013/0054306 A1 | 2/2013 | Bhalla et al. |
| 2013/0055145 A1 | 2/2013 | Antony et al. |
| 2013/0057551 A1 | 3/2013 | Ebert et al. |
| 2013/0096988 A1 | 4/2013 | Grossman et al. |
| 2013/0110746 A1 | 5/2013 | Ahn |
| 2013/0151453 A1 | 6/2013 | Bhanot et al. |
| 2013/0166348 A1 | 6/2013 | Scotto |
| 2013/0166480 A1 | 6/2013 | Popescu et al. |
| 2013/0185245 A1 | 7/2013 | Anderson et al. |
| 2013/0185307 A1 | 7/2013 | El-yaniv et al. |
| 2013/0218879 A1 | 8/2013 | Park et al. |
| 2013/0226318 A1 | 8/2013 | Procyk et al. |
| 2013/0238616 A1 | 9/2013 | Rose et al. |
| 2013/0246170 A1 | 9/2013 | Gross et al. |
| 2013/0246537 A1 | 9/2013 | Gaddala |
| 2013/0246597 A1 | 9/2013 | Iizawa et al. |
| 2013/0263019 A1 | 10/2013 | Castellanos et al. |
| 2013/0263289 A1* | 10/2013 | Vijayan .................. G06F 21/60 726/31 |
| 2013/0268520 A1 | 10/2013 | Fisher et al. |
| 2013/0282696 A1 | 10/2013 | John et al. |
| 2013/0290825 A1 | 10/2013 | Arndt et al. |
| 2013/0297619 A1 | 11/2013 | Chandrasekaran et al. |
| 2013/0304770 A1 | 11/2013 | Boero et al. |
| 2013/0318604 A1 | 11/2013 | Coates et al. |
| 2014/0012796 A1 | 1/2014 | Petersen et al. |
| 2014/0040371 A1 | 2/2014 | Gurevich et al. |
| 2014/0053091 A1 | 2/2014 | Hou et al. |
| 2014/0058914 A1 | 2/2014 | Song et al. |
| 2014/0068487 A1 | 3/2014 | Steiger et al. |
| 2014/0095509 A1 | 4/2014 | Patton |
| 2014/0108380 A1 | 4/2014 | Gotz et al. |
| 2014/0108985 A1 | 4/2014 | Scott et al. |
| 2014/0123279 A1 | 5/2014 | Bishop et al. |
| 2014/0136285 A1 | 5/2014 | Carvalho |
| 2014/0143009 A1 | 5/2014 | Brice et al. |
| 2014/0156527 A1 | 6/2014 | Grigg et al. |
| 2014/0157172 A1 | 6/2014 | Peery et al. |
| 2014/0164502 A1 | 6/2014 | Khodorenko et al. |
| 2014/0189536 A1 | 7/2014 | Lange et al. |
| 2014/0189870 A1 | 7/2014 | Singla et al. |
| 2014/0195515 A1 | 7/2014 | Baker et al. |
| 2014/0222521 A1 | 8/2014 | Chait |
| 2014/0222793 A1 | 8/2014 | Sadkin et al. |
| 2014/0229554 A1 | 8/2014 | Grunin et al. |
| 2014/0280056 A1 | 9/2014 | Kelly |
| 2014/0282160 A1 | 9/2014 | Zarpas |
| 2014/0344230 A1 | 11/2014 | Krause et al. |
| 2014/0358829 A1 | 12/2014 | Hurwitz |
| 2014/0366132 A1 | 12/2014 | Stiansen et al. |
| 2015/0073929 A1 | 3/2015 | Psota et al. |
| 2015/0073954 A1 | 3/2015 | Braff |
| 2015/0095773 A1 | 4/2015 | Gonsalves et al. |
| 2015/0100897 A1 | 4/2015 | Sun et al. |
| 2015/0106170 A1 | 4/2015 | Bonica |
| 2015/0106379 A1 | 4/2015 | Elliot et al. |
| 2015/0134599 A1 | 5/2015 | Banerjee et al. |
| 2015/0135256 A1 | 5/2015 | Hoy et al. |
| 2015/0188872 A1 | 7/2015 | White |
| 2015/0242401 A1 | 8/2015 | Liu |
| 2015/0338233 A1 | 11/2015 | Cervelli et al. |
| 2015/0379413 A1 | 12/2015 | Robertson et al. |
| 2016/0004764 A1 | 1/2016 | Chakerian et al. |
| 2016/0180557 A1 | 6/2016 | Yousaf et al. |
| 2017/0140039 A1* | 5/2017 | Neels ................ G06F 17/30696 |

FOREIGN PATENT DOCUMENTS

| | | |
|---|---|---|
| CN | 102054015 B | 5/2014 |
| DE | 102014204827 A1 | 9/2014 |
| DE | 102014204830 A1 | 9/2014 |
| DE | 102014204834 A1 | 9/2014 |
| EP | 2487610 A2 | 8/2012 |
| EP | 2858018 A1 | 4/2015 |
| EP | 2869211 A2 | 5/2015 |
| EP | 2889814 A1 | 7/2015 |
| EP | 2892197 A1 | 7/2015 |
| EP | 2963595 A1 | 1/2016 |
| EP | 2996053 A1 | 3/2016 |
| EP | 3035214 | 6/2016 |
| EP | 3038002 A1 | 6/2016 |
| EP | 3040885 A1 | 7/2016 |
| WO | WO-2005116851 A2 | 12/2005 |
| WO | WO-2012061162 A1 | 5/2012 |

OTHER PUBLICATIONS

"About OWA", Open Web Analytics, [Online]. Retrieved from the Internet: <URL: http://www.openwebanalytics.com/?page_id=2>, (Accessed: Jul. 19, 2013), 5 pgs.

"An Introduction to KeyLines and Network Visualization", Keylines. com, [Online]. Retrieved from the Internet: <URL: http://keylines.com/wp-content/uploads/2014/03/KeyLines-White-Paper.pdf>, (Mar. 2014), 8 pgs.

"Analytics for Data Driven Startups", Trak.io, [Online]. Retrieved from the Internet: <URL: http://trak.io/>, (Accessed: Jul. 18, 2013), 3 pgs.

"Appacts: Open Source Mobile Analytics Platform", http://www.appacts.com, (Jul. 18, 2013), 1-4.

"U.S. Appl. No. 13/827,491, Final Office Action dated Jun. 22, 2015", 28 pgs.

"U.S. Appl. No. 13/827,491, Non Final Office Action dated Oct. 9, 2015", 16 pgs.

"U.S. Appl. No. 13/827,491, Non Final Office Action dated Dec. 1, 2014", 5 pgs.

"U.S. Appl. No. 14/141,252, Final Office Action dated Apr. 14, 2016", 28 pgs.

"U.S. Appl. No. 14/141,252, Non Final Office Action dated Oct. 8, 2015", 11 pgs.

"U.S. Appl. No. 14/225,006, Advisory Action dated Dec. 21, 2015", 4 pgs.

"U.S. Appl. No. 14/225,006, Final Office Action dated Sep. 2, 2015", 28 pgs.

"U.S. Appl. No. 14/225,006, First Action Interview Pre-Interview Communication dated Feb. 27, 2015", 5 pgs.

"U.S. Appl. No. 14/225,006, First Action Interview Pre-Interview Communication dated Sep. 10, 2014", 4 pgs.

"U.S. Appl. No. 14/225,084, Examiner Interview Summary dated Jan. 4, 2016", 3 pgs.

"U.S. Appl. No. 14/225,084, Final Office Action dated Feb. 26, 2016", 14 pgs.

"U.S. Appl. No. 14/225,084, First Action Interview Pre-Interview Communication dated Feb. 20, 2015", 5 pgs.

"U.S. Appl. No. 14/225,084, First Action Interview Pre-Interview Communication dated Sep. 2, 2014", 17 pgs.

"U.S. Appl. No. 14/225,084, Non Final Office Action dated Sep. 11, 2015", 13 pgs.

"U.S. Appl. No. 14/225,084, Notice of Allowance dated May 4, 2015", 26 pgs.

(56) References Cited

OTHER PUBLICATIONS

"U.S. Appl. No. 14/225,160, Advisory Action dated May 20, 2015", 7 pgs.
"U.S. Appl. No. 14/225,160, Examiner Interview Summary dated Apr. 22, 2016", 7 pgs.
"U.S. Appl. No. 14/225,160, Final Office Action dated Jan. 25, 2016", 25 pgs.
"U.S. Appl. No. 14/225,160, Final Office Action dated Feb. 11, 2015", 30 pgs.
"U.S. Appl. No. 14/225,160, First Action Interview Pre-Interview Communication dated Jul. 29, 2014", 19 pgs.
"U.S. Appl. No. 14/225,160, First Action Interview Pre-Interview Communication dated Oct. 22, 2014", 6 pgs.
"U.S. Appl. No. 14/225,160, Non Final Office Action dated Jun. 16, 2016", 14 pgs.
"U.S. Appl. No. 14/225,160, Non Final Office Action dated Aug. 12, 2015", 23 pgs.
"U.S. Appl. No. 14/306,138, Examiner Interview Summary dated Dec. 3, 2015", 3 pgs.
"U.S. Appl. No. 14/306,138, Examiner Interview Summary dated Dec. 24, 2015", 5 pgs.
"U.S. Appl. No. 14/306,147, Final Office Action dated Dec. 24, 2015", 22 pgs.
"U.S. Appl. No. 14/319,161, Final Office Action dated Jan. 23, 2015", 21 pgs.
"U.S. Appl. No. 14/319,161, Notice of Allowance dated May 4, 2015", 6 pgs.
"U.S. Appl. No. 14/319,765, Non Final Office Action dated Feb. 1, 2016", 10 pgs.
"U.S. Appl. No. 14/323,935, Notice of Allowance dated Oct. 1, 2015", 8 pgs.
"U.S. Appl. No. 14/451,221, Non Final Office Action dated Oct. 21, 2014", 16 pgs.
"U.S. Appl. No. 14/463,615, Advisory Action dated Sep. 10, 2015", 3 pgs.
"U.S. Appl. No. 14/463,615, Final Office Action dated May 21, 2015", 31 pgs.
"U.S. Appl. No. 14/463,615, First Action Interview Pre-Interview Communication dated Jan. 28, 2015", 29 pgs.
"U.S. Appl. No. 14/463,615, First Action Interview Pre-Interview Communication dated Nov. 13, 2014", 4 pgs.
"U.S. Appl. No. 14/463,615, Non Final Office Action dated Dec. 9, 2015", 44 pgs.
"U.S. Appl. No. 14/479,863, First Action Interview Pre-Interview Communication dated Dec. 26, 2014", 5 pgs.
"U.S. Appl. No. 14/479,863, Notice of Allowance dated Mar. 31, 2015", 23 pgs.
"U.S. Appl. No. 14/483,527, Final Office Action dated Jun. 22, 2015", 17 pgs.
"U.S. Appl. No. 14/483,527, First Action Interview Pre-Interview Communication dated Jan. 28, 2015", 6 pgs.
"U.S. Appl. No. 14/483,527, Non Final Office Action dated Oct. 28, 2015", 20 pgs.
"U.S. Appl. No. 14/483,527, Notice of Allowance dated Apr. 29, 2016", 34 pgs.
"U.S. Appl. No. 14/552,336, First Action Interview Pre-Interview Communication dated Jul. 20, 2015", 18 pgs.
"U.S. Appl. No. 14/552,336, Notice of Allowance dated Nov. 3, 2015", 13 pgs.
"U.S. Appl. No. 14/562,524, First Action Interview Pre-Interview Communication dated Sep. 14, 2015", 12 pgs.
"U.S. Appl. No. 14/562,524, First Action Interview Pre-Interview Communication dated Nov. 10, 2015", 6 pgs.
"U.S. Appl. No. 14/571,098, Final Office Action dated Feb. 23, 2016", 37 pgs.
"U.S. Appl. No. 14/571,098, First Action Interview dated Aug. 24, 2015", 4 pgs.
"U.S. Appl. No. 14/571,098, First Action Interview Pre-Interview Communication dated Mar. 11, 2015", 4 pgs.
"U.S. Appl. No. 14/571,098, First Action Interview Pre-Interview Communication dated Aug. 5, 2015", 4 pgs.
"U.S. Appl. No. 14/571,098, First Action Interview Pre-Interview Communication dated Nov. 10, 2015", 5 pgs.
"U.S. Appl. No. 14/631,633, First Action Interview Pre-Interview Communication dated Sep. 10, 2015", 5 pgs.
"U.S. Appl. No. 14/676,621, Examiner Interview Summary dated Jul. 30, 2015", 5 pgs.
"U.S. Appl. No. 14/676,621, Final Office Action dated Oct. 29, 2015", 10 pgs.
"U.S. Appl. No. 14/746,671, First Action Interview Pre-Interview Communication dated Nov. 12, 2015", 19 pgs.
"U.S. Appl. No. 14/746,671, Notice of Allowance dated Jan. 21, 2016", 7 pgs.
"U.S. Appl. No. 14/800,447, First Action Interview Pre-Interview Communication dated Dec. 10, 2015", 26 pgs.
"U.S. Appl. No. 14/813,749, Final Office Action dated Apr. 8, 2016", 80 pgs.
"U.S. Appl. No. 14/813,749, Non Final Office Action dated Sep. 28, 2015", 22 pgs.
"U.S. Appl. No. 14/842,734, First Action Interview Pre-Interview Communication dated Nov. 19, 2015", 17 pgs.
"U.S. Appl. No. 14/858,647, Notice of Allowance dated Mar. 4, 2016", 47 pgs.
"U.S. Appl. No. 14/929,584, Final Office Action dated May 25, 2016", 42 pgs.
"U.S. Appl. No. 14/929,584, Non Final Office Action dated Feb. 4, 2016", 15 pgs.
"Apsalar—Mobile App Analytics & Advertising", https://apsalar.com/, (Jul. 18, 2013), 1-8.
"Beta Testing on the Fly", TestFlight, [Online]. Retrieved from the Internet: <URL:https://testflightapp. com/>, (Accessed: Jul. 18, 2013), 3 pgs.
"Countly", Countly Mobile Analytics, [Online]. Retrieved from the Internet: <URL: http://count.ly/products/screenshots, (accessed Jul. 18, 2013), 9 pgs.
"DISTIMO—App Analytics", [Online]. Retrieved from the Internet: <URL: http://www.distimo.com/app-analytics, (accessed Jul. 18, 2013), 5 pgs.
"European Application Serial. No. 14187996.5, Communication Pursuant to Article 94(3) EPC dated Feb. 19, 2016", 9 pgs.
"European Application Serial. No. 14187996.5, Extended European Search Report dated Feb. 12, 2015", 7 pgs.
"European Application Serial No. 14191540.5, Extended European Search Report dated May 27, 2015", 9 pgs.
"European Application Serial No. 14200246.8, Extended European Search Report dated May 29, 2015", 8 pgs.
"European Application Serial No. 14200298.9, Extended European Search Report dated May 13, 2015", 7 pgs.
"European Application Serial No. 15181419.1, Extended European Search Report dated Sep. 29, 2015", 7 pgs.
"European Application Serial No. 15184764.7, Extended European Search Report dated Dec. 14, 2015", 8 pgs.
"European Application Serial No. 15200073.3, Extended European Search Report dated Mar. 30, 2016", 16 pgs.
"European Application Serial 15201924.6, Extended European Search Report dated Apr. 25, 2016", 8 pgs.
"European Application Serial No. 15202919.5, Extended European Search Report dated May 9, 2016", 13 pgs.
"European Application Serial No. 16152984.7, Extended European Search Report dated Mar. 24, 2016", 8 pgs.
"Flurry Analytics", [Online]. Retrieved from the Internet: <URL: http://www.flurry.com/, (accessed Jul. 18, 2013), 14 pgs.
"Google Analytics Official Website—Web Analytics & Reporting", [Online]. Retrieved from the Internet: <URL: http ://www.google.com/ analytics/index.html, (accessed Jul. 18, 2013), 22 pgs.
"Great Britain Application Serial. No. 1404486.1, Combined Search Report and Examination Report dated Aug. 27, 2014", 5 pgs.
"Great Britain Application Serial No. 1404486.1, Office Action dated May 21, 2015", 2 pgs.
"Great Britain Application Serial No. 1404489.5, Combined Search Report and Examination Report dated Aug. 27, 2014", 5 pgs.

(56) References Cited

OTHER PUBLICATIONS

"Great Britain Application Serial No. 1404489.5, Office Action dated May 21, 2015", 3 pgs.
"Great Britain Application Serial No. 1404489.5, Office Action dated Oct. 6, 2014", 1 pgs.
"Great Britain Application Serial No. 1404499.4, Combined Search Report and Examination Report dated Aug. 20, 2014", 6 pgs.
"Great Britain Application Serial No. 1404499.4, Office Action dated Jun. 11, 2015", 5 pgs.
"Great Britain Application Serial No. 1404499.4, Office Action dated Sep. 29, 2014", 1 pg.
"Hunchlab: Heat Map and Kernel Density Calculation for Crime Analysis", Azavea Journal, [Online]. Retrieved from the Internet: <www.azavea.com/blogs/newsletter/v4i4/kernel-density-capabilities-added-to-hunchlab>, (Sep. 9, 2014), 2 pgs.
"KeyLines Datasheet", Keylines.com, [Online]. Retrieved from the Internet: <URL: http://keylines.com/wp-content/uploads/2014/03/KeyLines-datasheet.pdf>, (Mar. 2014), 2 pgs.
"Mixpanel: Actions speak louder than page views", Mobile Analytics, [Online]. Retrieved from the Internet: <URL: https://mixpanel.com/>, (Accessed: Jul. 18, 2013), 13 pgs.
"Mobile App Marketing & Analytics", Localytics, [Online]. Retrieved from the Internet: <URL: http://www.localytics.com/>, (Accessed: Jul. 18, 2013), 12 pgs.
"Mobile Web", Wikipedia:, [Online] retrieved from the internet:https://en.wikipedia.org/w/index.php?title=Mobile Web&oldid=643800164, (Jan. 23, 2015), 6 pgs.
"ModelRisk Version 5—ModelRisk Help", Part One—Vose Software, (2007), 375 pgs.
"ModelRisk Version 5—ModelRisk Help", Part Two—Vose Software, (2003), 362 pgs.
"More than android analytics", UserMetrix, [Online]. Retrieved from the Internet: <URL: http://usermetrix.com/android-analytics>, (Accessed: Jul. 18, 2013), 3 pgs.
"More Than Mobile Analytics", Kontagent, [Online]. Retrieved from the Internet: <URL: http://www.kontagent.com/>, (Accessed: Jul. 18, 2013), 9 pgs.
"Multimap", Wikipedia, [Online]. Retrieved from the Internet: <URL: https://en.wikipedia.org/w/index.php?title=Multimap&oldid=530800748>, (Jan. 1, 2013), 2 pgs.
"Netherlands Application Serial No. 2012417, Netherlands Search Report dated Sep. 18, 2015", W/ English Translation, 9 pgs.
"Netherlands Application Serial No. 2012421, Netherlands Search Report dated Sep. 18, 2015", 8 pgs.
"Netherlands Application Serial No. 2012438, Search Report dated Sep. 21, 2015", 8 pgs.
"New Zealand Application Serial No. 622473, First Examination Report dated Mar. 27, 2014", 3 pgs.
"New Zealand Application Serial No. 622473, Office Action dated Jun. 19, 2014", 2 pgs.
"New Zealand Application Serial No. 622513, Office Action dated Apr. 3, 2014", 2 pgs.
"New Zealand Application Serial No. 628161, First Examination Report dated Aug. 25, 2014", 2 pgs.
"Piwik- Free Web Analytics Software", Piwik, [Online]. Retrieved from the Internet: <URL: http://piwik.org/>, (Accessed: Jul. 19, 2013), 18 pgs.
"Realtime Constant Customer Touchpoint", Capptain-Pilot your apps, [Online] retrieved from the internet: <http://www.capptain.com>, (accessed Jul. 18, 2013), 6 pgs.
"Refresh CSS ellipsis when resizing container", Stack Overflow, [Online]. Retrieved from the Internet: <URL: http://stackoverflow.com/questions/17964681/refresh-css-ellipsis-when-resizing-container>, (Accessed: May 18, 2015), 1 pg.
"SAP BusinessObjects Explorer Online Help", SAP BusinessObjects, (Mar. 19, 2012), 68 pgs.
"Visualizing Threats: Improved Cyber Security Through Network Visualization", Keylines.com, [Online] retrieved from the internet: <http://keylines.com/wp-content/uploads/2014/04/Visualizing-Threats1.pdf>, (May 12, 2014), 10 pgs.
"Welcome to StatCounter—Visitor Analysis for Your Website", StatCounter, [Online]. Retrieved from the Internet: <URL: http://statcounter.com/>, (Accessed: Jul. 19, 2013), 17 pgs.
Andrew, G. Psaltis, "Streaming Data—Designing the real-time pipeline", vol. MEAP V03, (Jan. 16, 2015), 16 pgs.
Celik, T, "CSS Basic User Interface Module Level 3 (CSS3 UI)", Section 8; Resizing and Overflow, [Online] retrieved from the internet: <http://www.w3.org/TR/20121WD-css3-ui-20120117/#resizing-amp-overflow>, (Jan. 17, 2012), 1-58.
Chaudhuri, Surajit, et al., "An Overview of Business Intelligence Technology", Communications of the ACM, vol. 54, No. 8., (Aug. 2011), 88-98.
Cohn, David, et al., "Semi-supervised Clustering with User Feedback", Cornell University, (2003), 9 pgs.
Gill, Leicester, et al., "Computerised linking of medical methodological guidelines", 3rournal of Epidemiolog and Coimmunity Health 47, (1993), pp. 316-319.
Gorr, et al., "Crime Hot Spot Forecasting: Modeling and Comparative Evaluation", Grant 98-IJ-CX-K005, (May 6, 2002), 37 pgs.
Gu, Lifang, et al., "Record Linkage: Current Practice and Future Directions", (Jan. 15, 2004), 32 pgs.
Hansen, D., et al., "Analyzing Social Media Networks with NodeXL: Insights from a Connected World", Chapter 4, pp. 53-67 and Chapter 10, pp. 143-164 (Sep. 2010), 53-67; 143-164.
Hua, Yu, et al., "A Multi-attribute Data Structure with Parallel Bloom Filters for Network Services", HIPC 2006, LNCS 4297, (2006), 277-288.
Jan-Keno, Janssen, "Wo bist'n du?—Googles Geodienst Latitude", Not in English, [Online] retrieved from the internet:http://www.heise.de/artikel-archiv/ct/2011/03/086/@00250@/ct.11.03.086-088.pdf, (Jan. 17, 2011), 86-88.
Manno, et al., "Introducing Collaboration in Single-user Applications through the Centralized Control Architecture", (2010), 10 pgs.
Phillip, J Windley, "The Live Web: Building Event-Based Connections in the Cloud", Course Technology PTR, (Dec. 21, 2011), 61 pgs.
Sigrist, Christian, et al., "PROSITE, a Protein Domain Database for Functional Characterization and Annotation", Nucleic Acids Research, vol. 38, (2010), D161-D166.
Valentini, Giorgio, et al., "Ensembles of Learning Machines", Lecture Notes in Computer Science: Neural Nets, Springer Berlin Heidelberg, (Sep. 26, 2002), 3-20.
Wang, Guohua, et al., "Research on a Clustering Data De-Duplication Mechanism Based on Bloom Filter", IEEE, (2010), 5 pgs.
Winkler, William E, et al., "Record Linkage Software and Methods for Merging Administrative Lists", Bureau of the Census Statistical Research Division: Statistical Research Report Series, No. RR2001/03, (Jul. 23, 2001), 11 pgs.

\* cited by examiner

1100

ABC1

Overview  Properties  Text

Properties

Unit Number    Unit1
Plant Code     Plant1
Description    Description1
Location       Location1
Work Order ID  WorkOrder1

Related Investigations

Tokens

No Tokens

Related Documents

No Related Documents

Notes

View all 40 →

Open Investigation

Related

ABC 5
Material Material3
Unit No. Unit 56
Plant Plant1
Location Location4

WD: 9876
Material Material3
Unit No. Unit 56
Plant Plant1
Location Location 2

DATA ANALYSIS SYSTEM TO FACILITATE INVESTIGATIVE PROCESS

PRIORITY CLAIM

This application claims the benefit of priority of U.S. Provisional Application Ser. No. 62/447,760, titled "DATA ANALYSIS SYSTEM TO FACILITATE INVESTIGATIVE PROCESS," filed on Jan. 18, 2017, which is hereby incorporated by reference.

TECHNICAL FIELD

The present disclosure generally relates to the technical field of special-purpose machines that facilitate investigative processes, including computerized variants of such special-purpose machines and improvements to such variants, and to the technologies by which such special-purpose machines become improved compared to other special-purpose machines that facilitate investigative processes. In particular, the present disclosure addresses systems and methods for data gathering and analysis to facilitate investigative processes.

BACKGROUND

There are many contexts in which an investigatory process may be used to discover facts and information. For example, in the context of product manufacturing, an investigation may be conducted to determine the root cause of a manufacturing defect. As another example, an investigation in the context of criminal justice may be conducted to identify the perpetrator of a crime. Broadly speaking, an investigatory process generally involves gathering data, analyzing the data, and drawing conclusions from the analysis of the data. Given the wealth of readily available computerized information in the digital information age of today, the data gathering step of the investigatory process may be technically challenging because pertinent data may be spread out among many disparate computer systems and may be maintained in many different data types and formats. The vast amount of data in combination with the varied data types and formats gives rise to an additional challenge in the analysis step of the investigatory process given the difficulty in identifying a most relevant subset of the pertinent data and identifying critical connections between data points needed to produce accurate and informed conclusions.

Furthermore, although a prior investigation may have led to conclusions that may be useful in future investigations, conventional computerized systems used to facilitate investigations typically fail to provide a mechanism whereby investigators may leverage knowledge or solutions gleaned in previous related investigations. As a result, the entire investigation process must be repeated despite prior efforts made in related investigation that may otherwise be used to mitigate computational and workflow inefficiencies and reduce the use of computational and network resources.

BRIEF DESCRIPTION OF THE DRAWINGS

Various ones of the appended drawings merely illustrate example embodiments of the present inventive subject matter and cannot be considered as limiting its scope.

FIG. 10-14 illustrate various aspects of user interfaces provided by the data analysis system, according to some embodiments.

DETAILED DESCRIPTION

Reference will now be made in detail to specific example embodiments for carrying out the inventive subject matter. Examples of these specific embodiments are illustrated in the accompanying drawings, and specific details are set forth in the following description in order to provide a thorough understanding of the subject matter. It will be understood that these examples are not intended to limit the scope of the claims to the illustrated embodiments. On the contrary, they are intended to cover such alternatives, modifications, and equivalents as may be included within the scope of the disclosure.

Disclosed are data gathering and analysis systems, methods, and computer-readable storage media to facilitate an investigation process. The system includes an ingest component to ingest data of various types and formats from multiple disparate sources. The ingest component is responsible for obtaining source data comprising a collection of data objects and transforming each object in the source data into data objects with a particular structure that is suitable for use with the system. The ingest component further automatically creates linkages between related objects (e.g., two objects that reference a same unique identifier such as that of a particular part or component of a product).

The system further includes a search component having a user interface (UI) that allows users to submit keyword searches to aid in the analysis of the ingested data to reach conclusions regarding an investigative issue (e.g., an issue for which the system is being used to perform an investigation). The search component, in turn, searches the ingested data and returns a set of results matching the keywords. The UI of the search component may, for example, allow users to search for documents that reference a particular identifier (e.g., a particular part number). The UI of the search component may further include multiple filter selections that allow users to narrow a set of search results by certain properties such as object type. Users may also manually link objects and create textual notes related to such linkages. For example, the users may link data objects included in the set of results with a data object representative of the investigative issue.

The system further includes a tracking component that tracks and stores the activity of users while engaged with the UI. The user activity may, for example, include keyword searches performed, objects accessed, linkages generated, and notes created. The tracking component stores the user activity in a data object linked to the investigative issue. The data object storing the tracked user activity may be provided as a search result during subsequent searches performed as part of an investigative process involving a related investigative issue (e.g., an issue related to the same part or component of a product).

Figure 1:
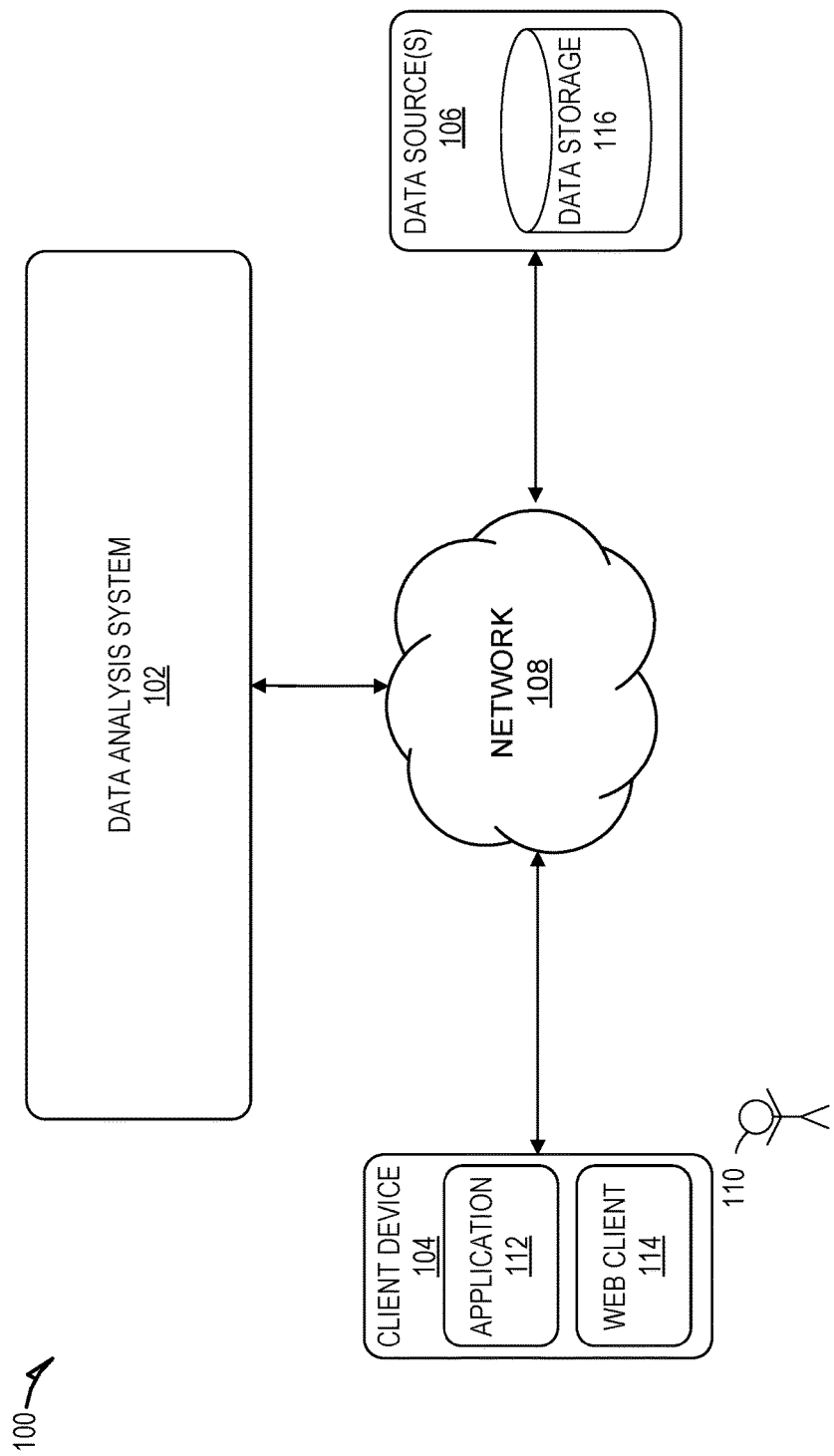
FIG. 1 is a network diagram depicting a system in which a data analysis system configured to facilitate an investigative process may be deployed, according to some embodiments.

FIG. 1 is a network diagram depicting a system 100 in which a data analysis system 102 configured to facilitate an investigative process may be deployed, according to some embodiments. While the system 100 shown in FIG. 1 may employ a client-server architecture, the present inventive subject matter is, of course, not limited to such an architecture, and could equally well find application in an event-driven, distributed, or peer-to-peer architecture system, for example. Moreover, it shall be appreciated that although the various functional components of the system 100 are discussed in the singular sense, multiple instances of one or more of the various functional components may be employed.

As shown, system 100 can include multiple computing devices coupled to a communication network 108 and configured to communicate with each other through use of the communication network 108. The communication network 108 can be any type of network, including a local area network ("LAN"), such as an intranet; a wide area network ("WAN"), such as the Internet, or any combination thereof. Further, the communication network 108 can be a public network, a private network, or a combination thereof. The communication network 108 can also be implemented using any number of communication links associated with one or more service providers, including one or more wired communication links, one or more wireless communication links, or any combination thereof. Additionally, the communication network 108 can be configured to support the transmission of data formatted using any number of protocols.

Multiple computing devices can be coupled to the communication network 108. A computing device can be any type of general computing device capable of network communication with other computing devices. For example, a computing device can be a personal computing device such as a desktop or workstation; a business server; or a portable computing device, such as a laptop, smart phone, or tablet personal computer (PC). A computing device can include some or all of the features, components, and peripherals of machine 1600 of FIG. 16.

As shown, the system 100 includes the data analysis system 102, a client device 104, and a data source(s) 106, all communicatively coupled to each other via the network 108. In the system 100, a user 110 can interact with the data analysis system 102 through the client device 104 coupled to the communication network 108 by direct and/or indirect communication. The client device 104 can be any of a variety of types of computing devices that include at least a display, a computer processor, and communication capabilities that provide access to the communication network 108 (e.g., a smart phone, a tablet computer, a personal digital assistant (PDA), a personal navigation device (PND), a handheld computer, a desktop computer, a laptop or netbook, or a wearable computing device).

The data analysis system 102 can comprise one or more computing devices and support connections from a variety of different types of the client devices 104, such as desktop computers, mobile computers, mobile communications devices (e.g., mobile phones, smart phones, and tablets), smart televisions, set-top boxes, and/or any other network-enabled computing devices. The client device 104 can be of varying types, capabilities, operating systems, etc. Furthermore, the data analysis system 102 can concurrently accept connections from and interact with multiple client devices 104.

The user 110 can interact with the data analysis system 102 via a client-side application 112 installed on the client device 104. In some embodiments, the client-side application 112 can include a data analysis system—specific component. For example, the component can be a standalone application, one or more application plug-ins, and/or a browser extension. However, the user 110 can also interact with the data analysis system 102 via a web client 114 (e.g., a web browser) that resides on the client device 104 and is configured to communicate with the data analysis system 102. In either case, the client-side application 112 and/or the web client 114 can present a user interface (UI) for the user 110 to interact with data the analysis system 102.

The system 100 also includes data source(s) 106 that store source data to be ingested and analyzed by the data analysis system 102. For example, the data source(s) 106 can include data storage(s) 116 configured to store source data. The source data may include a plurality of data objects of various types and formats.

Figure 2:
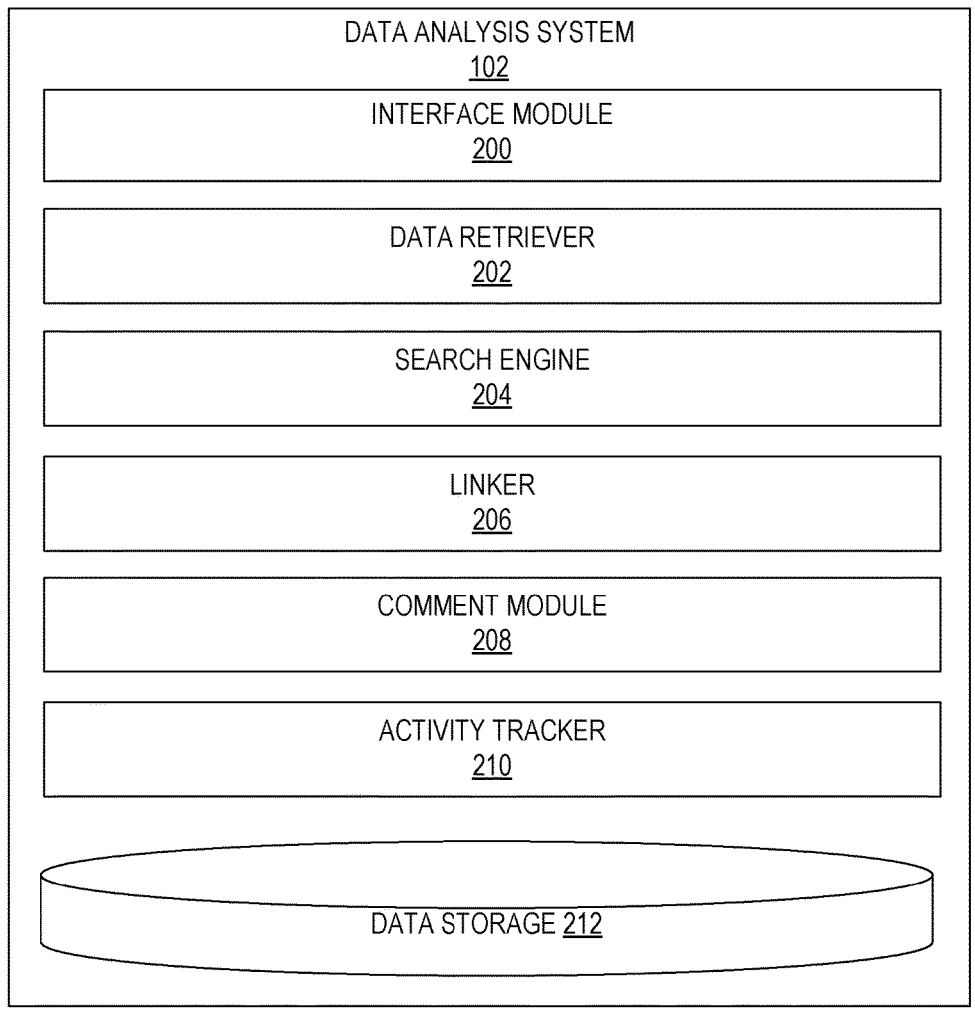
FIG. 2 is a block diagram illustrating various modules embodied within the data analysis system, according to some embodiments.

FIG. 2 is a block diagram illustrating various modules embodied within the data analysis system 102, consistent with some embodiments. To avoid obscuring the inventive subject matter with unnecessary detail, various functional components (e.g., modules, engines, and databases) that are not germane to conveying an understanding of the inventive subject matter have been omitted from FIG. 2. However, a skilled artisan will readily recognize that various additional functional components may be supported by the data analysis system 102 to facilitate additional functionality that is not specifically described herein. As shown, the data analysis system 102 includes: an interface module 200; a data retriever 202; a search engine 204; a linker 206; a comment module 208; an activity tracker 210; and a data storage 212. Each of the above referenced functional components of the data analysis system 102 are configured to communicate with each other (e.g., via a bus, shared memory, a switch, or application programming interfaces (APIs)).

The interface module 200 provides a number of interfaces (e.g., APIs) that allow data to be exchanged between the client device 104 and the data analysis system 102. The interface module 200 receives requests from the client device 104, and communicates appropriate responses to the client device 104. For example, the interface module 200 may receive requests from devices in the form of Hypertext Transfer Protocol (HTTP) requests or other web-based, API requests.

The interface module 200 also provides UIs to devices (e.g., client device 104) that provide various functionalities to users and include graphical representations of various aspects of the data analysis system 102. To provide a UI to the client device 104, the interface module 200 transmits a set of machine-readable instructions to the client device 104 that causes the client device 104 to present the UI on a display of the client device 104. The set of machine-readable instructions may, for example, include presentation data (e.g., representing the UI) and a set of instructions to display the presentation data. The client device 104 may temporarily store the presentation data to enable display of the UI.

The UIs provided by the interface module 200 include a search interface that allows users to generate and submit search queries, and in return, the search interface presents search results matching the submitted search queries. The interfaces may also include various input control elements (e.g., sliders, buttons, drop-down menus, check-boxes, and data entry fields) that allow users to specify various inputs, and the interface module 200 receives and processes user input received through such input control elements. For example, the search interface may include various input control elements that allow users to select various filters and sort criteria. The search interface filters and/or sorts information in accordance with user selections made via the input control elements. Depending on the filters selected, the filtering of information may include adding or removing one or more data objects included in a set of search results. Depending on the specified sorting selection, the sorting of information may include displaying search results in a particular order (e.g., ascending or descending order), a particular grouping, or combinations of both. The UIs provided by the interface module 200 may also include various graphs, tables, charts, and other graphics. Examples of these UIs provided by the interface module 200 (e.g., to the client device 104) are discussed below in reference to FIGS. 10-15.

The data retriever 202 is configured to retrieve and integrate source data for analysis in the data analysis system 102. The source data obtained by the data retriever 202 includes data objects of various types and in various formats. For example, the source data may include electronic documents (e.g., .pdf and .doc files) as well as media content such as audio (e.g., .mp3 files) and video (e.g., .mov and .avi files). The types of information represented by the source data varies depending on the context in which the data analysis system 102 is deployed. In the example context of product manufacturing, the source data may include issue reports (e.g., defects reports), technical documentation, design specifications, product drawings, models, mock-ups, drawings, work orders, bills of materials, and other types of product documentation.

In some instances, the data retriever 202 retrieves source data from the data source(s) 106 through appropriate requests (e.g., API requests or calls) transmitted over the network 108. The data may be retrieved by the data retriever 202 on a routine basis or as changes to the data are detected.

In integrating the source data into the data analysis system 102, the data retriever 202 may perform operations including cleaning, extracting, transforming, and translating source data objects to create data objects in an appropriate format and structure for use with the data analysis system 102. Each data object created during the ingest phase is a data structure that includes the content of the source data object and may further include additional metadata. Each ingested data object may also be assigned a unique identifier during the ingest phase. The source data that is retrieved and integrated into the data analysis system 102 is stored in the data storage 212 for subsequent searching and analysis by other components of the data analysis system 102.

The search engine 204 is responsible for searching the data storage 212 to identify data objects matching user search queries. To this end, the search engine 204 receives user search queries submitted through the search interface provided by the interface module 200, and analyzes the data objects stored in the data storage 212 to identify data objects that match search query terms included in the search queries. The matching data objects identified by the search engine 204 are those data objects that include at least one instance of at least one search query term. The matching data objects identified by the search engine 204 constitute a set of search results, which the search engine 204 passes to the interface module 200 for presentation to the user 110 on the client device 104 within the search interface.

The linker 206 is responsible for linking related data objects stored in the data storage 212. The linker 206 may link data objects by modifying the data objects to include references to each other (e.g., references to the unique identifiers of the data object or references to the locations in memory of the data objects). As an example, the linker 206 may link two data objects by modifying a first data object to include a reference to a second data object (e.g., a reference to a unique identifier corresponding to the second data object) and modifying the second data object to include a reference to the first data object (e.g., a reference to a unique identifier corresponding to the first data object).

In some instances, the linker 206 may automatically link related data objects stored in the data storage 212. For example, the linker 206 may work in conjunction with the data retriever 202 to link related data objects during the ingesting of the source data. In some instances, the linker 206 may link related data objects in response to receiving user input entered via a UI provided by the interface module 200. In this way, the users 110 are provided with the ability to manually link data objects.

The comment module 208 is responsible for processing user comments related to data objects stored in the data storage 212. To this end, the comment module 208 may work in conjunction with the interface module 200 to display a comment component (e.g., a window), which is an interface element operable to receive user comments related to one or more data objects. The comment component includes a field for users to submit comments. The user comments may, for example, be in the form of text, image, audio, or video. The comment component may, for example, be presented in response to the user 110 manually linking two or more data objects, and the user comment may thusly relate to the linking of the two or more data objects (e.g., an explanation of the reason for the linking). Additionally, the comment module 208 works in conjunction with the interface module 200 to present the received user comments in the comment component. Depending on the type of comment received, the presentation of the comment may include displaying a textual comment, displaying all or part of a video file or image, or presenting all or part of an audio file.

The user activity tracker 210 is responsible for tracking user activity on the data analysis system 102. The user activity includes actions performed by users while using the data analysis system 102 to investigate an investigatory issue. The actions performed by the user include interactions with UIs provided by the data analysis system 102. For example, the user activity may include one or more of the following: a search query input by the user, a search result (e.g., data object) accessed by the user, a linkage between two or more data objects generated by the user, a token created by the user, or a comment created by the user.

The investigative issue is the subject of an investigation. The type of investigative issues involved in an investigation depends upon the context in which the data analysis system 102 is deployed. For example, in the context of product manufacturing, an investigative issue may be a product defect (e.g., a deviation) of a particular product to product specifications, standards, or expectations. As part of initiating an investigation (also referred to herein as an "investigative process"), a user may specify, using one or more UI elements provided by the interface module 200, a particular investigative issue using a unique identifier of the investigative issue, and the data analysis system 102 may, in turn, use the unique identifier to access a data object from the data storage 212 that represents the investigative issue (also referred to herein as the "investigation object"). The investigation objects may include or correspond to an issue report or another type document that is a recordation of an investigatory issue. In the exemplary context of product manufacturing, an investigation object may include or correspond to a defect report describing a deviation of a product from a product design, specification, or standard.

The user activity tracker 210 is further configured to create a record (e.g., a data object or other data structure) of tracked user activity during each investigation session (also referred to herein as a "user activity record"). The user activity tracker 210 stores each user activity record in the data storage 212, and links each record to the investigation object corresponding to the investigative issue involved in the investigation session. In some embodiments, the user activity tracker 210 may link a user activity record to a corresponding data object by modifying the investigation object to include a reference to the user activity record (e.g., a reference to an identifier of the record or a reference to a memory location of the record). In some embodiments, the user activity tracker 210 may link a user activity record to a corresponding data object by incorporating the user activity record into the investigation object. The user activity tracker 210 may further work in conjunction with the interface module 200 to provide a graphical representation of the user activity record to the client device 104 for display to the user.

The data storage 212 is a network-accessible machine-readable storage medium. In addition to ingested data objects, the data storage 212 also stores data investigation objects representing investigative issues (e.g., product defects) and user activity records representing user activity during investigation sessions.

As is understood by skilled artisans in the relevant computer and Internet-related arts, each functional component (e.g., engine, module, or data storage 212) illustrated in FIG. 2 may be implemented using hardware (e.g., a processor of a machine) or a combination of logic (e.g., executable software instructions) and hardware (e.g., memory and processor of a machine) for executing the logic. Furthermore, the various functional components depicted in FIG. 2 may reside on a single machine (e.g., a server) or may be distributed across several machines in various arrangements such as cloud-based architectures. Moreover, any two or more of these components may be combined into a single component (e.g., a single module), and the functions described herein for a single component may be subdivided among multiple modules. Functional details of these modules are described below with respect to FIGS. 3-9.

Figure 3:
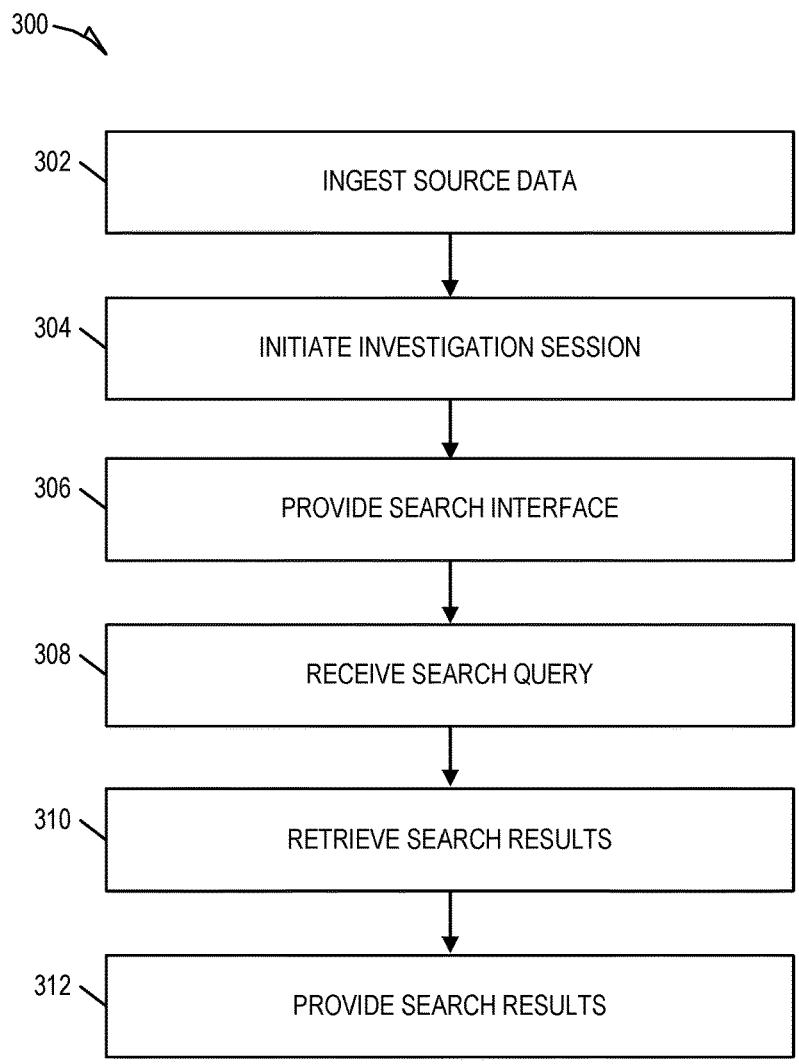
FIGS. 3-9 are flowcharts illustrating example operations of the data analysis system in performing a method for analyzing a collection of data objects as a part of an investigation, according to some embodiments.

FIG. 3 is a flowchart illustrating a method 300 for providing qualitative and quantitative measures of an industrial equipment's condition, according to some embodiments. The method 300 may be embodied in computer-readable instructions for execution by one or more processors such that the operations of the method 300 may be performed in part or in whole by the data analysis system 102; accordingly, the method 300 is described below by way of example with reference thereto. However, it shall be appreciated that at least some of the operations of the method 300 may be deployed on various other hardware configurations and the method 300 is not intended to be limited to the data analysis system 102.

At operation 302, which may, in some embodiments, be performed in on offline manner, the data retriever 202 ingests source data obtained from the data source(s) 106. The source data obtained by the data retriever 202 includes data objects of various types and in various formats (e.g., electronic documents such as .pdf and .doc files and media content such as audio and video files). As noted above, the types of information represented by the source data varies depending on the context in which the data analysis system 102 is deployed. In integrating the source data into the data analysis system 102, the data retriever 202 may perform operations including cleaning, extracting, transforming, and translating source data objects to create data objects in an appropriate format and structure for use with the data analysis system 102. Each ingested data object may also be assigned a unique identifier during the ingest phase. The ingesting of the source data further includes storing the data objects in the data storage 212.

At operation 304, the data analysis system 102 initiates an investigation session. The initiating of the investigation session may be in response to a user request to initiate the investigation session received from the client device 104, which may be submitted by the user using a UI provided to the client device 104. The request to initiate the investigation session may include a unique identifier of an investigative issue specified by the user using the above referenced UI. Accordingly, the initiating of the investigation session may include accessing, from the data storage 212, an investigation object (e.g., included in the source data) corresponding to the investigative issue using the unique identifier specified by the user. The investigation object may include the unique identifier and a description of the investigative issue.

In some instances, the investigation object representing the investigative issue may be linked to one or more other data objects included in the data storage 212. In the example context of product manufacturing, the investigative issue may be a derivation from a design specification or standard, and thus, the data object representing the investigative issue may be linked to a second data object corresponding to a design specification or standard. As another example, the data object may be linked to a user activity record performed during a prior investigation of the investigative issue or a related investigative issue, and thus, the investigation object representing the investigative issue may be linked to the user activity record. In these instances, the initiating of the investigation session may further include accessing one or more additional data objects that are linked to the investigation object.

At operation 306, the interface module 200 provides a search interface to the client device 104. The providing of the search interface may include transmitting a set of machine-readable instructions to the client device 104 that causes the client device 104 to present the search interface on a display of the client device 104. The set of machine-readable instructions may, for example, include presentation data (e.g., representing the search interface) and a set of instructions to display the presentation data. The search interface includes at least one input element to receive a user search query comprising one or more search query terms (e.g., keywords or other search criteria). The search interface may further include one or more input elements to aid the user in generating the one or more search query terms.

At operation 308, the search engine 204 receives a search query input by the user using the search interface. As noted above, the search query includes one or more search query terms.

At operation 310, the search engine 204 retrieves a set of search results from the data storage 212. The set of search results include one or more data objects matching at least one of the search query terms included in the search query. The search engine 204 identifies the set of search results from among the data objects stored in the data storage 212 by analyzing the data objects to identify matches to at least one of the search query terms. The search engine 204 may employ any number of known search algorithms to identify results for the search query.

At operation 312, the interface module 200 provides the set of search results retrieved by the search engine 204 to the client device 104. In providing the search results to the client device 104, the interface module 200 may cause presentation of the search results within a portion of the search interface (e.g., a side panel or a new page). An example of a user interface for presenting search results is illustrated in FIG. 11 and described below, according to some example embodiments.

Figure 4:
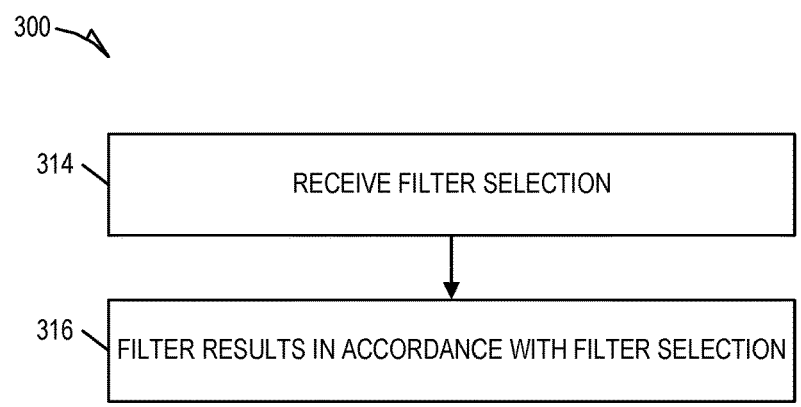

As shown in FIG. 4, the method 300 may, in some embodiments, also include operations 314, and 316. Consistent with some embodiments, the operations 314 and 316 may be performed subsequent to the operation 312.

At operation 314, the interface module 200 receives, via the client device 104, a filter selection from among multiple filters presented in conjunction with the set of search results. The filters may, for example, include a general filter, a responsibility filter, a time filter, or a status filter. General filters are used to specify object or document types or categories. Responsibility filters are used to specify a responsible party associated with objects included in the set of search results. Time filters are used to specify temporal criteria related to objects such as dates or date ranges of object creation, review, modification, or inclusion in the data storage 212. Status filters are used to specify certain statuses or tokens associated with objects such as "critical," "needs scheduling," "reviewed," or "scheduled."

At operation 316, the interface module 200 of the data analysis system 102 filters the set of search results presented in the portion of the search interface in accordance with the filter selection. Depending on what other filter selections have been selected, if any, the filtering of the search results may include adding or removing one or more search results. For example, upon receiving a filter selection corresponding to a category of object, the interface module 200 may remove search results that do not fall within the category of object specified by the filter selection.

Figure 5:
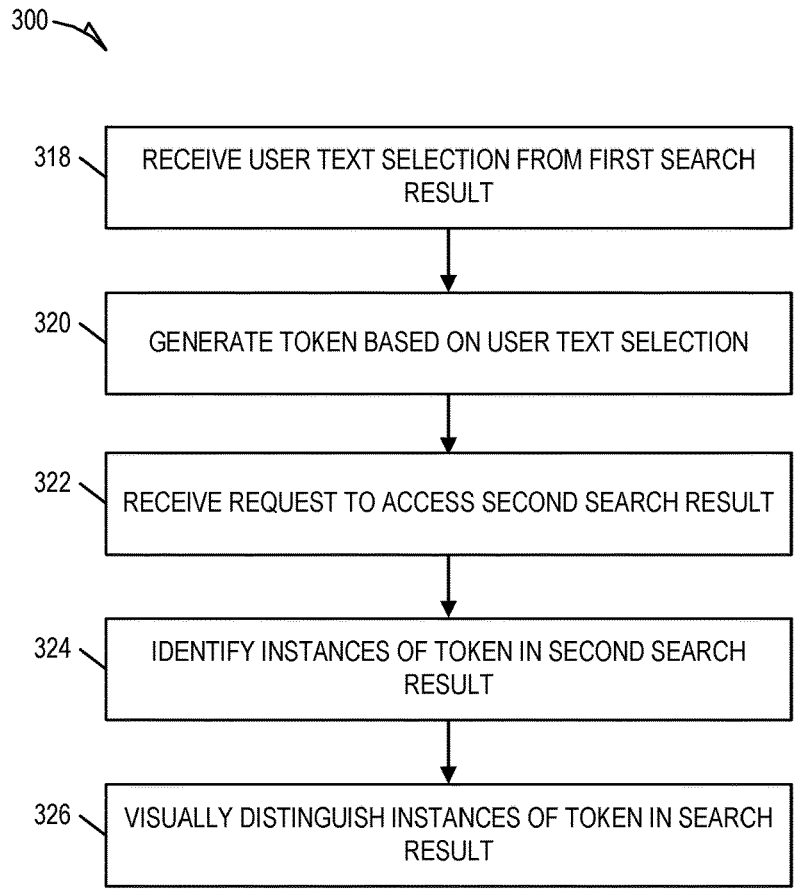

As shown in FIG. 5, the method 300 may, in some embodiments, also include operations 318, 320, 322, 324, and 326. Consistent with some embodiments, the operations 318, 320, 322, 324, and 326 may be performed subsequent to the operation 312, where the interface module 200 provides a set of search results for display on the client device 104, or subsequent to operation 316, where the interface module 200 filters the set of search results. In the context of operations 318, 320, 322, 324, and 326, the user has selected a first search result (e.g., a first object) from the set of search results that includes text, and the interface module 200 has caused presentation of the search result to the user on the display of the client device 104.

At operation 318, the interface module 200 receives a user text selection from the first search result. The text selection includes a portion of the text of the search result. Accordingly, the text selection may include one or more terms. The user may, for example, select the text by using a mouse or other input device to highlight the text using a cursor. The search interface may further include a selectable element (e.g., a button) that allows the user to request that the data analysis system 102 generate a token based the highlighted text.

At operation 320, the search engine 204 generates a token based on the text selection from the first search result. The search engine 204 may utilize the token to identify additional instances of the user text selection in the remainder of the search results.

At operation 322, the interface module 200 receives a request to access a second search result (e.g., a second object) from the set of search results presented within the portion of the search interface. At operation 324, the search engine 204 analyzes the second search result (e.g., a text analysis) to identify any instances of the token in the second search result. In other words, the search engine 204 identifies additional uses of the user text selection from the first result that are also included in the second search result.

At operation 326, the interface module 200 visually distinguishes the instances of the token included in the second search result. The interface module 200 may visually distinguish the token using highlighting. In instances in which multiple tokens have been included, the interface module 200 may employ a different color highlighting for each token.

Figure 6:
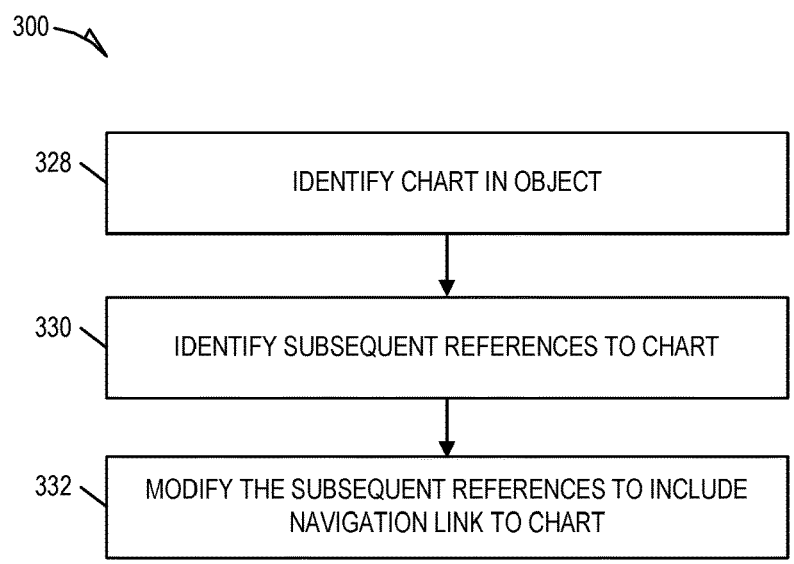

As shown in FIG. 6, the method 300 may, in some embodiments, also include operations 328, 330, and 332. Consistent with some embodiments, the operations 328, 330, and 332 may be performed as part of (e.g., a precursor task, a subroutine, or a portion) operation 302, where the data retriever 202 ingests source data from data source(s) 106.

At operation 328, the data retriever 202 identifies a chart (e.g., a table, graph, or figure) included in a data object. The data retriever 202 identifies the chart by performing a textual analysis on the data object. In performing the textual analysis, the data retriever 202 searches the data objects for use of one or more terms frequently used to refer to charts (e.g., "chart," "figure," "table," and "graph") used in conjunction with one or more numbers and a delimiter (e.g., a colon).

At operation 330, the data retriever 202 identifies subsequent references to the chart included in the data object. Similar to identification of the chart itself, the data retriever 202 searches for subsequent uses of the term used to refer to the chart used in conjunction with one or more numbers and a delimiter (e.g., a colon).

At operation 332, the data retriever 202 modifies the data object such that the subsequent references to the chart include a navigation link to the chart. The navigation link, when activated during display of the data object, causes the display to navigate to the chart itself (e.g., the initial reference to the chart). In this way, users viewing large documents that include multiple references to a single chart can immediately jump back to the chart to review information referenced later in the document.

Although the operations 328, 330, and 332 have been described above for a single data object for ease of explanation, these operations may be performed for each source data object included in the source data. Further, although only a single chart is involved in the operations 328, 330, and 332, the data retriever 202 may perform the operations 328, 330, and 332 for each chart included in the source data.

Figure 7:
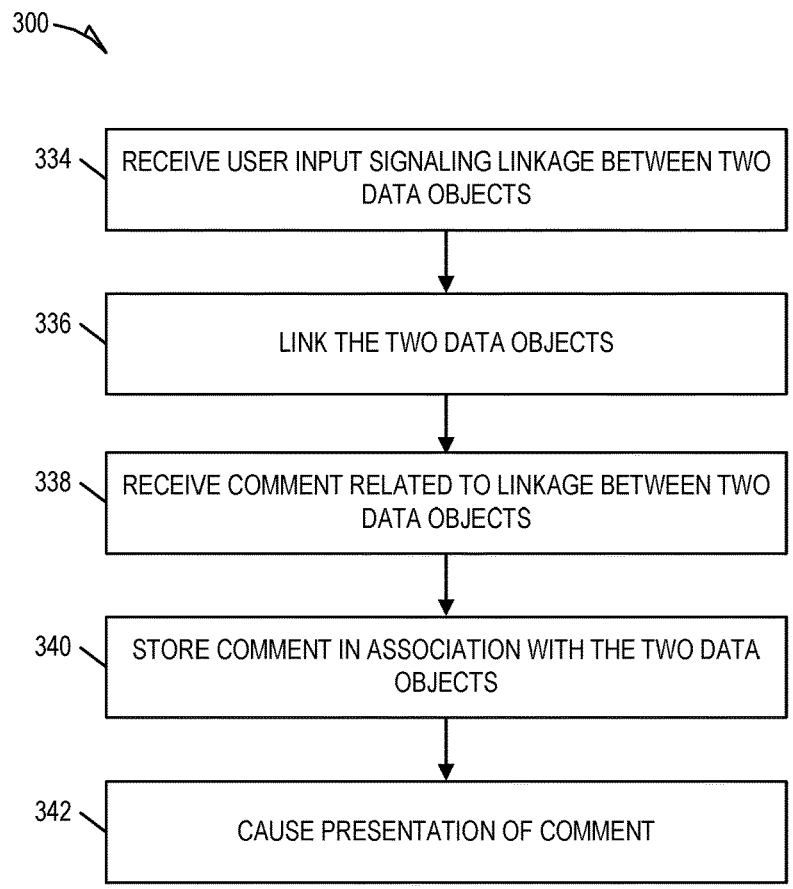

As shown in FIG. 7, the method 300 may, in some embodiments, also include operations 334, 336, 338, 340, and 342. Consistent with some embodiments, operations 334, 336, 338, 340, and 342 may be performed subsequent to the operation 312, where the interface module 200 provides the set of search results to the client device 104.

At operation 334, interface module 200 receives user input signaling a linkage between two data objects. In some instances, the two data objects may be included in the set of search results provided to the client device 104. In other instance, the linkage is between a data object included in the set of search results, and the investigation object representing the investigative issue. The user input may, for example, include selection of a selectable element (e.g., a button) provided within the search interface along with the search result.

At operation 336, the linker 206 links the two data objects in response to receiving the user input. The linker 206 may link the two data objects by modifying a first data object to include a reference to a second data object (e.g., a reference to a unique identifier corresponding to the second data object) and modifying the second data object to include a reference to the first data object (e.g., a reference to a unique identifier corresponding to the first data object).

At operation 338, the interface module 200, working in conjunction with the comment module 208, receives a user-generated (e.g., human-generated) comment input via a comment component displayed in conjunction with the search interface. The comment relates to the linkage between the two data objects. For example, the comment may include an explanation of the reason for creating the linkage. As noted above, the user generated comment may be in the form of text, audio, video, or various combinations thereof.

At operation 340, the comment module 208 stores the user generated comment in association with the user-edited score. For example, the edit/comment module 208 may store the user-generated comment as part of the corresponding equipment object.

At operation 342, the interface module 200, working in conjunction with the comment module 208, causes presentation of the user-generated comment within the comment component (e.g., by transmitting a set of machine-readable instructions to the device 104 that causes the device 104 to present the user-generated comment). Depending on the type of comment received, the presentation of the comment may include displaying a textual comment, displaying all or part of a video file, or presenting all or part of an audio file.

Figure 8:
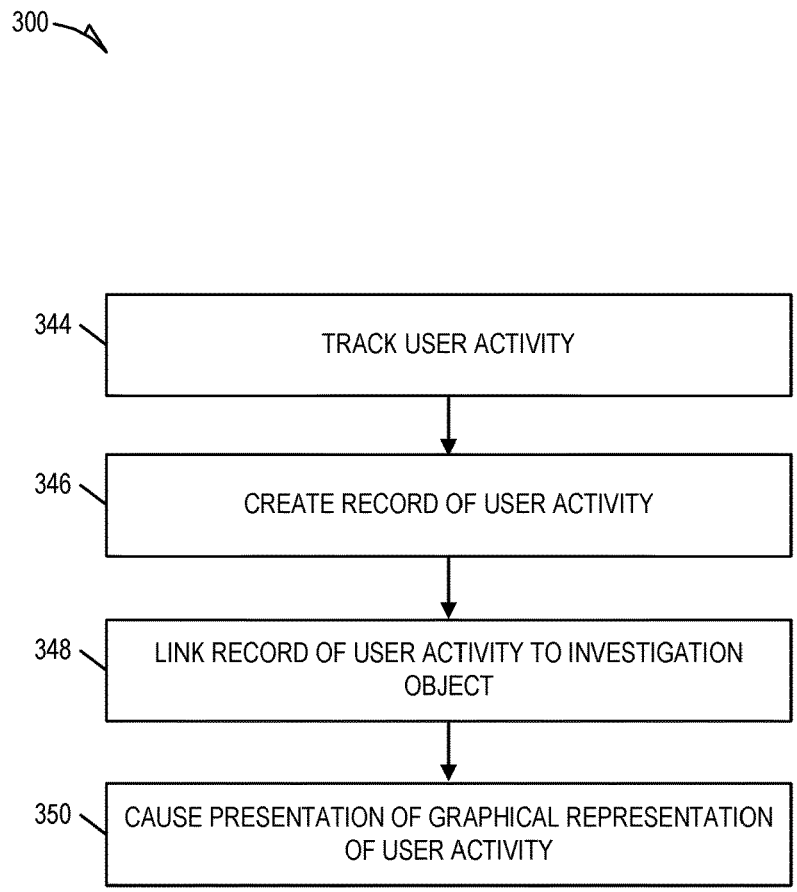

As shown in FIG. 8, the method 300 may, in some embodiments, also include operations 344, 346, 348, and 350. Consistent with some embodiments, the operations 344, 346, 348, and 350 may be performed subsequent to the operation 304, where the interface module 200 provides the set of search results to the client device 104.

At operation 344, the activity tracker 210 tracks user activity of the user on the data analysis system 102 during the investigative session involving the investigatory issue (e.g., represented by the data object accessed during operation 304 as part of initiating the investigation session). The user activity includes user actions performed as part of the investigation session including user interactions with the search interface. For example, the user activity may include one or more of the following: a search query input by the user (including any filters added), a search result (e.g., data object) accessed by the user, a linkage between two or more data objects generated by the user, a token created by the user, or a comment created by the user.

At operation 346, the activity tracker 210 creates a record (e.g., a data structure) of the user activity involving the investigatory issue. The record includes the user actions performed as part of the investigation session involving the investigative issue.

As noted above, as part of initiating the investigation session, the data analysis system 102 accesses the investigation objects that correspond to the investigative issue that is the subject of the investigation session. At operation 348, the activity tracker 210 links the user activity record with the investigation object representing the investigative issue. In some embodiments, the user activity record and the investigation object may be stored independently, and the activity tracker 210 may link the user activity record with the investigation object by modifying the data object to include a reference to the record.

At operation 350, the interface module 200 causes presentation of a graphical representation of the user activity in a portion of the search interface (e.g., a side panel). The graphical representation of the user activity may include a textual list describing the one or more actions. The search interface may include one or more input control elements that allow users to sort and filter the information included in the textual list. Further, in some embodiments, the textual list describing the one or more actions may include one or more navigation links that correspond to a user action. For example, the user actions may include accessing a particular object from the search results, and the textual list may include a navigation link that allows users to easily access the particular object through selection of the navigation link. In another example, the user actions may include generating a comment, and the textual list may include a navigation link that allows users to access the comment through selection of the navigation link. In yet another example, the user actions may include a search query with one or more filters applied, and the textual list may include a navigation link that allows the user to return to the corresponding filtered set of search results.

Figure 9:
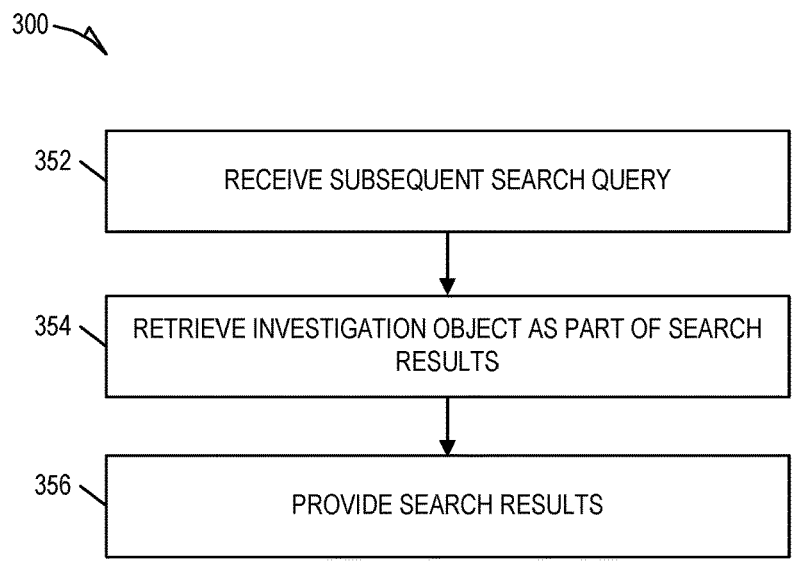

As shown in FIG. 9, the method 300 may, in some embodiments, also include operations 352, 354, and 356. Consistent with some embodiments, the operations 352, 354, and 356 may be performed subsequent to the operation 348, where the linker 206 links the investigation object with the user activity record.

At operation 352, the interface module 200 receives a subsequent search query entered by the user using the search interface displayed on the client device 104. In some instances, the subsequent search query is received during the investigation session initiated at operation 304. In other instances, the subsequent query is received during a different investigation session involving a different investigative issue.

At operation 354, the search engine 206 retrieves the investigation object as part of a subsequent set of search results. The search engine 206 may retrieve the investigation object based one or more search query terms included in the search query. For example, the search query may include one or more terms that are related to one or more user actions included in the user activity record linked to the investigation object.

At operation 356, the interface module 200 provides the set of search results retrieved by the search engine 206 to the client device 104. In providing the search results to the client device 104, the interface module 200 may cause presentation of a graphical representation of the user activity record linked to the investigation object along with the search results.

Figure 10:
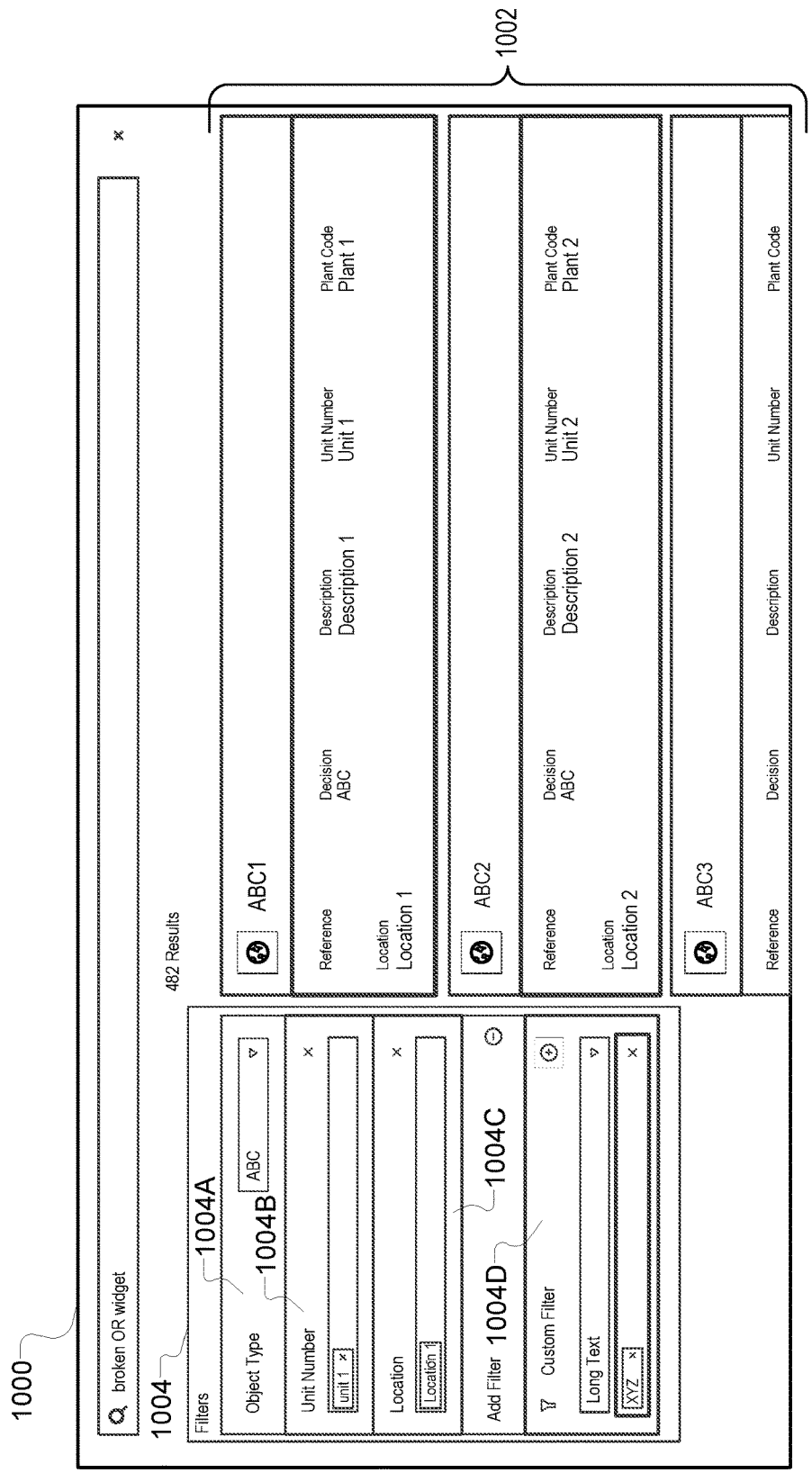

FIG. 10 is an interface diagram illustrating a view 1000 of a search interface provided by the interface module 200 of the data analysis system 102, according to some example embodiments. As shown, the view 1000 includes a selectable list of search results 1002. The search results 1002 may correspond to data objects stored in the data storage 212. The search results 1002 presented within the view 1000 may, for example, be presented in response to a user query entered 1010 into a search bar presented within the search interface. In the example illustrated in FIG. 10, the search results 1002 presented within the view 1000 are returned for the search query "broken OR widget," which is also displayed within the view 1000.

The view 1000 also includes a filter panel 1004 that includes a set of user filter selections used to filter the set of search results. In the example illustrated in FIG. 10, a user has selected an object type filter 1004A, object property filters 1004B and 1004C, and a custom filter 1004D that includes a threshold text count (e.g., a minimum number of characters).

FIG. 11 is an interface diagram illustrating an object view 1100 of the search interface provided by the interface module 200 of the data analysis system 102, according to some example embodiments. As shown, the object view 1100 includes detailed information about a particular data object including a unique identifier, object properties, and related investigations. The data object may be presented within a set of search results such as the search results 1002 presented in the view 1000 of FIG. 10. The object view 1100 may be accessed, for example, through user selection of one of the search results presented in the selectable list of search results 1002 presented within the search interface of FIG. 10.

The object view 1100 also includes a related objects panel 1102 that lists objects related to the object described in the object view. A user may access an object view of any one of the related objects through selection of the object identifier included in the related objects panel 1102.

Figure 12:
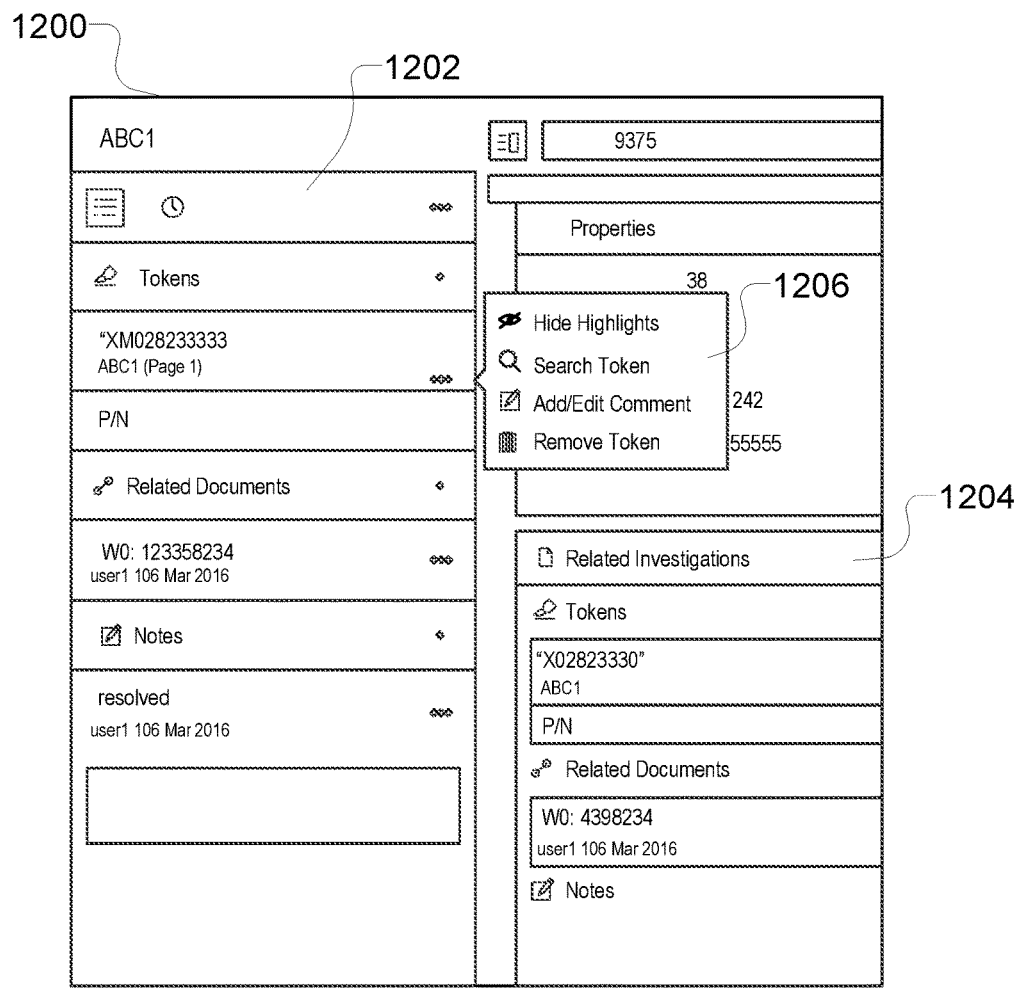

FIG. 12 is an interface diagram illustrating a view 1200 of the search interface provided by the interface module 200 of the data analysis system 102, according to some example embodiments. The view 1200 includes an investigation panel 1202 that includes information (e.g., comments and objects) added to an investigation object during an investigation. The view 1200 also includes a related investigation section 1204 that includes information summarizing related investigations. The view 1200 further includes a token management element 1206 that includes a list of selectable actions for managing (e.g., creating, using, editing, and removing) tokens created by users. Further details regarding the creation and use of tokens are discussed above in reference to FIG. 5.

Figure 13:
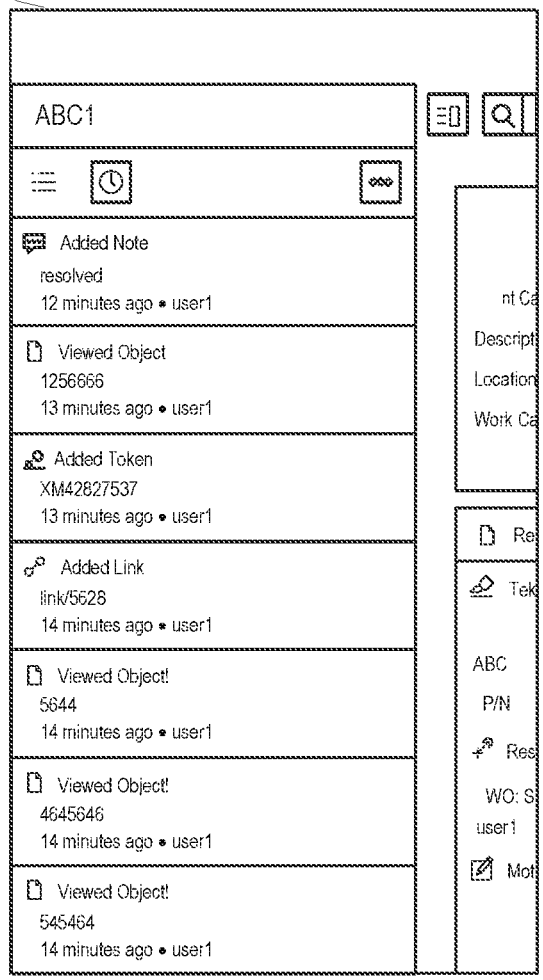

FIG. 13 is an interface diagram illustrating a view 1300 of the search interface provided by the interface module 200 of the data analysis system 102, according to some example embodiment. The view 1300 includes a graphical representation of user activity. The graphical representation includes a selectable list of actions performed by a user during an investigation session. The actions may be included in a user activity record linked to an investigation object corresponding to the investigative issue involved in the investigation session (e.g., the object described in the object view 1100 of FIG. 11). A user may select any one of the actions displayed in the list to return to the action or view information associated with the action.

Figure 14:
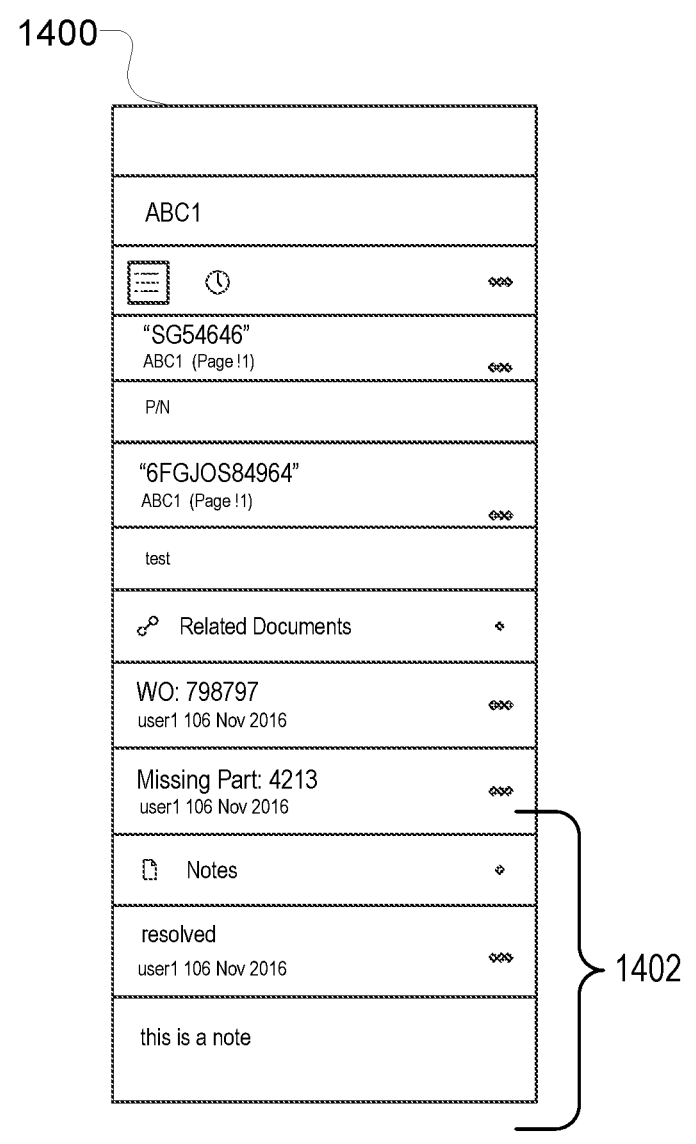

FIG. 14 is an interface diagram illustrating a view 1400 of the search interface provided by the interface module 200 of the data analysis system 102, according to some example embodiment. The view 1400 includes a comment component 1402 presented within a side panel among other components. The comment component 1402 presents user comments (textual comments in this example) and may be used to create, modify, or deleted user comments.

Modules, Components, and Logic

Certain embodiments are described herein as including logic or a number of components, modules, or mechanisms. Modules may constitute either software modules (e.g., code embodied on a machine-readable medium) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field-programmable gate array (FPGA) or an application specific integrated circuit (ASIC). A hardware module may also include programmable logic or circuitry that is temporarily configured by software to perform certain operations. For example, a hardware module may include software executed by a general-purpose processor or other programmable processor. Once configured by such software, hardware modules become specific machines (or specific components of a machine) uniquely tailored to perform the configured functions and are no longer general-purpose processors. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software accordingly configures a particular processor or processors, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, with a particular processor or processors being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network 108 (e.g., the Internet) and via one or more appropriate interfaces (e.g., an API).

The performance of certain of the operations may be distributed among the processors, not only residing within a single machine, but deployed across a number of machines. In some example embodiments, the processors or processor-implemented modules may be located in a single geographic location (e.g., within a home environment, an office environment, or a server farm). In other example embodiments, the processors or processor-implemented modules may be distributed across a number of geographic locations.

Example Machine Architecture and Machine-Readable Medium

Figure 15:
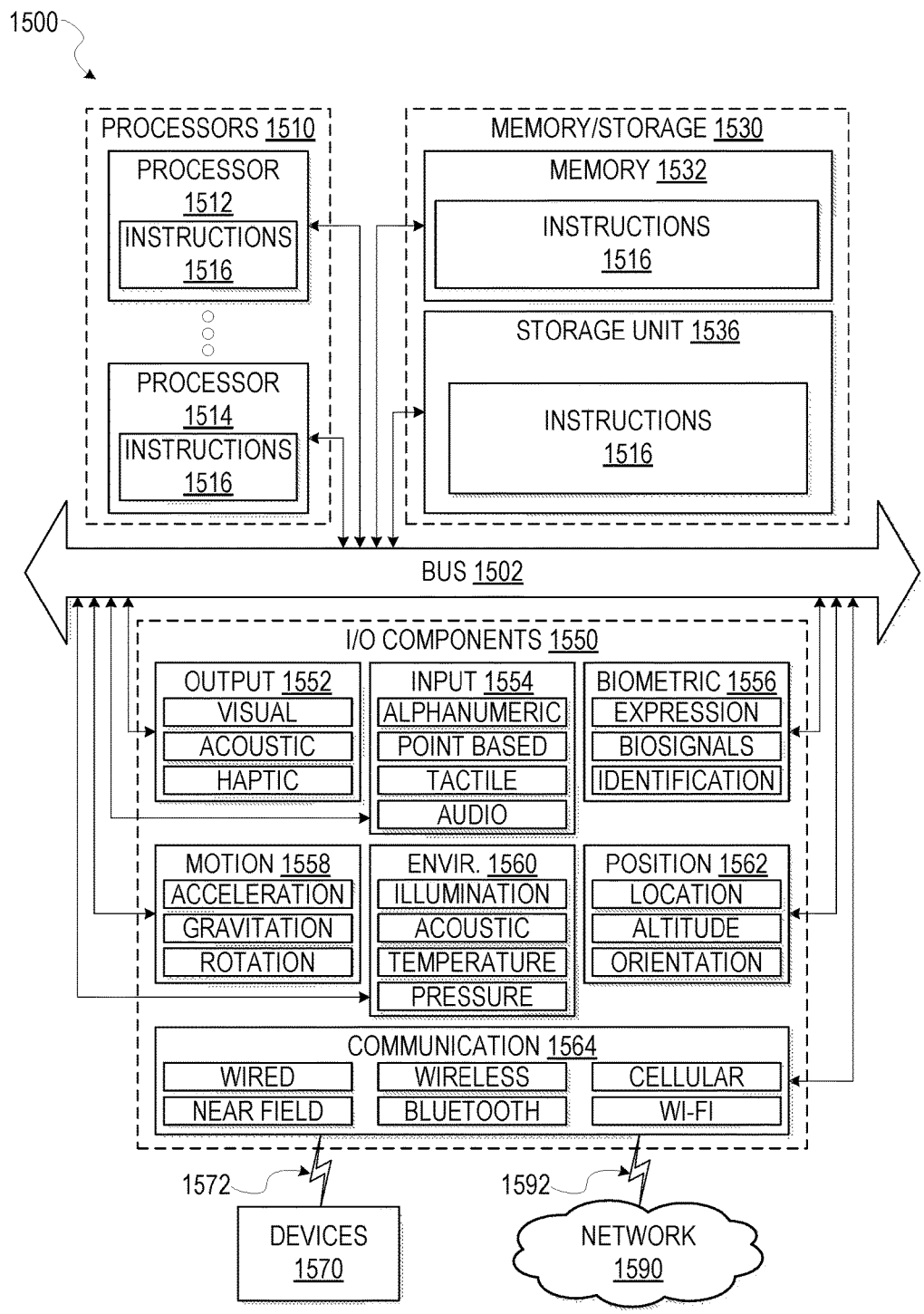
FIG. 15 is a diagrammatic representation of a machine in the example form of a computer system within which a set of instructions for causing the machine to perform any one or more of the methodologies discussed herein may be executed.

FIG. 15 is a block diagram illustrating components of a machine 1500, according to some example embodiments, able to read instructions from a machine-readable medium (e.g., a machine-readable storage medium) and perform any one or more of the methodologies discussed herein. Specifically, FIG. 15 shows a diagrammatic representation of the machine 1500 in the example form of a computer system, within which instructions 1516 (e.g., software, a program, an application, an applet, an app, or other executable code) for causing the machine 1500 to perform any one or more of the methodologies discussed herein may be executed. Additionally, or alternatively, the machine 1500 may correspond to any one of the data analysis system 102, the client device 104, or the third-party computing system 106. The instructions 1516 transform the general, non-programmed machine into a particular machine programmed to carry out the described and illustrated functions in the manner described. In alternative embodiments, the machine 1500 operates as a standalone device or may be coupled (e.g., networked) to other machines. In a networked deployment, the machine 1500 may operate in the capacity of a server machine or a client machine in a server-client network environment, or as a peer machine in a peer-to-peer (or distributed) network environment. The machine 1500 may comprise, but not be limited to, a server computer, a client computer, a personal computer (PC), a tablet computer, a laptop computer, a netbook, a set-top box (STB), a PDA, an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1516, sequentially or otherwise, that specify actions to be taken by the machine 1500. Further, while only a single machine 1500 is illustrated, the term "machine" shall also be taken to include a collection of machines 1500 that individually or jointly execute the instructions 1516 to perform any one or more of the methodologies discussed herein.

The machine 1500 may include processors 1510, memory/storage 1530, and input/output (I/O) components 1550, which may be configured to communicate with each other such as via a bus 1502. In an example embodiment, the processors 1510 (e.g., a central processing unit (CPU), a reduced instruction set computing (RISC) processor, a complex instruction set computing (CISC) processor, a graphics processing unit (GPU), a digital signal processor (DSP), an ASIC, a radio-frequency integrated circuit (RFIC), another processor, or any suitable combination thereof) may include, for example, a processor 1512 and a processor 1514 that may execute the instructions 1516. The term "processor" is intended to include a multi-core processor that may comprise two or more independent processors (sometimes referred to as "cores") that may execute instructions contemporaneously. Although FIG. 15 shows multiple processors 1510, the machine 1500 may include a single processor with a single core, a single processor with multiple cores (e.g., a multi-core processor), multiple processors with a single core, multiple processors with multiples cores, or any combination thereof.

The memory/storage 1530 may include a memory 1532, such as a main memory, or other memory storage, and a storage unit 1536, both accessible to the processors 1510 such as via the bus 1502. The storage unit 1536 and memory 1532 store the instructions 1516 embodying any one or more of the methodologies or functions described herein. The instructions 1516 may also reside, completely or partially, within the memory 1532, within the storage unit 1536, within at least one of the processors 1510 (e.g., within the processor's cache memory), or any suitable combination thereof, during execution thereof by the machine 1500. Accordingly, the memory 1532, the storage unit 1536, and the memory of the processors 1510 are examples of machine-readable media.

As used herein, "machine-readable medium" means a device able to store instructions and data temporarily or permanently, and may include, but is not limited to, random-access memory (RAM), read-only memory (ROM), buffer memory, flash memory, optical media, magnetic media, cache memory, other types of storage (e.g., erasable programmable read-only memory (EEPROM)), and/or any suitable combination thereof. The term "machine-readable medium" should be taken to include a single medium or multiple media (e.g., a centralized or distributed database, or associated caches and servers) able to store the instructions 1516. The term "machine-readable medium" shall also be taken to include any medium, or combination of multiple media, that is capable of storing instructions (e.g., instructions 1516) for execution by a machine (e.g., machine 1500), such that the instructions, when executed by one or more processors of the machine (e.g., processors 1510), cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

Furthermore, the machine-readable medium is non-transitory in that it does not embody a propagating signal. However, labeling the tangible machine-readable medium "non-transitory" should not be construed to mean that the medium is incapable of movement; the medium should be considered as being transportable from one real-world location to another. Additionally, since the machine-readable medium is tangible, the medium may be considered to be a machine-readable storage device.

The I/O components 1550 may include a wide variety of components to receive input, provide output, produce output, transmit information, exchange information, capture measurements, and so on. The specific I/O components 1550 that are included in a particular machine will depend on the type of machine. For example, portable machines such as mobile phones will likely include a touch input device or other such input mechanisms, while a headless server machine will likely not include such a touch input device. It will be appreciated that the I/O components 1550 may include many other components that are not shown in FIG. 15. The I/O components 1550 are grouped according to functionality merely for simplifying the following discussion and the grouping is in no way limiting. In various example embodiments, the I/O components 1550 may include output components 1552 and input components 1554. The output components 1552 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1554 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the I/O components 1550 may include biometric components 1556, motion components 1558, environmental components 1560, or position components 1562 among a wide array of other components. For example, the biometric components 1556 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 1558 may include acceleration sensor components (e.g., accelerometer), gravitation sensor components, rotation sensor components (e.g., gyroscope), and so forth. The environmental components 1560 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 1562 may include location sensor components (e.g., a Global Position System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1550 may include communication components 1564 operable to couple the machine 1500 to a network 1590 or devices 1570 via a coupling 1592 and a coupling 1572, respectively. For example, the communication components 1564 may include a network interface component or other suitable device to interface with the network 1590. In further examples, the communication components 1564 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 1570 may be another machine or any of a wide variety of peripheral devices (e.g., a peripheral device coupled via a Universal Serial Bus (USB)).

Moreover, the communication components 1564 may detect identifiers or include components operable to detect identifiers. For example, the communication components 1564 may include radio frequency identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF4150, Ultra Code, UCC RSS-2D bar code, and other optical codes), or acoustic detection components (e.g., microphones to identify tagged audio signals). In addition, a variety of information may be derived via the communication components 1564, such as location via Internet Protocol (IP) geo-location, location via Wi-Fi® signal triangulation, location via detecting an NFC beacon signal that may indicate a particular location, and so forth.

Transmission Medium

In various example embodiments, one or more portions of the network 1590 may be an ad hoc network, an intranet, an extranet, a VPN, a LAN, a WLAN, a WAN, a WWAN, a MAN, the Internet, a portion of the Internet, a portion of the PSTN, a plain old telephone service (POTS) network, a cellular telephone network, a wireless network, a WiFi® network, another type of network, or a combination of two or more such networks. For example, the network 1590 or a portion of the network 1590 may include a wireless or cellular network and the coupling 1592 may be a Code Division Multiple Access (CDMA) connection, a Global System for Mobile communications (GSM) connection, or another type of cellular or wireless coupling. In this example, the coupling 1592 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long range protocols, or other data transfer technology.

The instructions 1516 may be transmitted or received over the network 1590 using a transmission medium via a network interface device (e.g., a network interface component included in the communication components 1564) and using any one of a number of well-known transfer protocols (e.g., HTTP). Similarly, the instructions 1516 may be transmitted or received using a transmission medium via the coupling 1572 (e.g., a peer-to-peer coupling) to the devices 1570. The term "transmission medium" shall be taken to include any intangible medium that is capable of storing, encoding, or carrying the instructions 1516 for execution by the machine 1500, and includes digital or analog communications signals or other intangible media to facilitate communication of such software.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

In this document, the terms "a" or "an" are used, as is common in patent documents, to include one or more than one, independent of any other instances or usages of "at least one" or "one or more." In the appended claims, the terms "including" and "in which" are used as the plain-English equivalents of the respective terms "comprising" and "wherein." Also, in the following claims, the terms "including" and "comprising" are open-ended; that is, a system, device, article, or process that includes elements in addition to those listed after such a term in a claim are still deemed to fall within the scope of that claim. Moreover, in the following claims, the terms "first," "second," "third," and so forth are used merely as labels, and are not intended to impose numerical requirements on their objects.

What is claimed is:

1. A system comprising:
   one or more processors of a machine; and
   a memory storing instructions that, when executed by the one or more processors, cause the one or more processors to perform operations comprising:
   accessing, from a machine-readable storage device, a data object representing an investigative issue;
   causing presentation, on a display of a device, of a user interface configured to receive user search queries and to present search results for each received search query;
   causing presentation of a set of search results within the user interface in response to receiving a search query;
   receiving a user selection of one or more filters;
   filtering the search results in accordance with the one or more filters;
   receiving a user selection of text included in a particular search result of the set of search results;
   generating a token that includes the text;
   identifying additional instances of the token in a remainder of the set of search results;
   upon receiving a request to present one of the remainder of the set of search results, visually distinguishing the additional instances of the token in the one of the remainder of the set of search results;
   tracking user activity that includes one or more user actions performed as part of an investigation of the investigatory issue, the one or more user actions including user interactions with the user interface;
   creating a record of the user activity involving the investigatory issue, the record including the one or more user actions; and
   linking the record of the user activity with the data object representing the investigative issue, the linking of the record of user activity with the data object including modifying the data object to include a reference to the record of user activity.

2. The system of claim 1, wherein the operations further comprise:

receiving a further search query including a unique identifier of the investigatory issue;

retrieving, using the unique identifier, the record of the user activity in response to the further search query; and causing presentation of the record of the user activity in a set of search results matching the further search query.

3. The system of claim 1, wherein the operations further comprise causing presentation of a graphical representation of the user activity within a portion of the user interface, the graphical representation of the user activity including a textual list of the one or more user actions.

4. The system of claim 1, wherein the reference to the record of user activity includes at least one of a unique identifier of the record or a location in memory of the record.

5. The system of claim 1, wherein the one or more user actions include at least one of: a search query input by the user, a search result accessed by the user, a linkage between two or more data objects generated by the user, a token created by the user, or a note created by the user.

6. The system of claim 1, wherein the operations further comprise:

ingesting, from one or more network based databases, source data comprising a plurality of data objects; and automatically linking two or more data objects based on one or more similar properties included in the two or more data objects.

7. The system of claim 1, wherein the operations further comprise:

receiving user input signaling a linkage between two or more data objects; and linking the two or more data objects in response to receiving the user input.

8. The system of claim 7, wherein the operations further comprise:

receiving a user generated textual note related to the linkage between the two or more data objects; and storing the user generated textual note with a further linkage to the two or more data objects.

9. The system of claim 1, wherein the user interface further presents filters to filter search results, the filters including at least one of a general filter, a responsibility filter, a time filter, or a status filter.

10. A method comprising:

accessing, from a machine-readable storage device, a data object representing an investigative issue;

causing presentation, on a display of a device, of a user interface configured to receive user search queries and present search results for each received search query;

causing presentation of a set of search results within the user interface in response to receiving a search query;

receiving a user selection of one or more filters;

filtering the search results in accordance with the one or more filters;

receiving a user selection of text included in a particular search result of the set of search results;

generating a token that includes the text;

identifying additional instances of the token in a remainder of the set of search results;

upon receiving a request to present one of the remainder of the set of search results, visually distinguishing the additional instances of the token in the one of the remainder of the set of search results;

tracking user activity that includes one or more user actions performed as part of an investigation of the investigatory issue, the one or more user actions including user interactions with the user interface;

creating, by one or more processors, a record of the user activity involving the investigatory issue, the record including the one or more user actions; and linking the record of the user activity with the data object representing the investigative issue, the linking of the record of user activity with the data object including modifying the data object to include the record of user activity.

11. The method of claim 10, further comprising:

receiving a further search query including a unique identifier of the investigatory issue;

retrieving, using the unique identifier, the record of the user activity in response to the further search query; and causing presentation of the record of the user activity in a set of search results matching the further search query.

12. The method of claim 10, further comprising causing presentation of a graphical representation of the user activity within a portion of the user interface, the graphical representation of the user activity including a textual list of the one or more user actions.

13. The method of claim 10, wherein the one or more user actions include at least one of: a search query input by the user, a search result accessed by the user, a linkage between two or more data objects generated by the user, a token created by the user, or a note created by the user.

14. The method of claim 10, further comprising:

ingesting, from one or more network based databases, source data comprising a plurality of data objects; and automatically linking two or more data objects based on one or more similar properties included in the two or more data objects.

15. The method of claim 10, further comprising:

receiving user input signaling a linkage between two or more data objects; and linking the two or more data objects in response to receiving the user input.

16. A machine-readable storage device embodying instructions that, when executed by at least one processor of a machine, cause the machine to perform operations comprising:

accessing a data object representing an investigative issue;

causing presentation, on a display of a device, of a user interface configured to receive user search queries and present search results for each received search query;

causing presentation of a set of search results within the user interface in response to receiving a search query;

receiving a user selection of one or more filters;

filtering the search results in accordance with the one or more filters;

receiving a user selection of text included in a particular search result of the set of search results;

generating a token that includes the text;

identifying additional instances of the token in a remainder of the set of search results;

upon receiving a request to present one of the remainder of the set of search results, visually distinguishing the additional instances of the token in the one of the remainder of the set of search results;

tracking user activity that includes one or more user actions performed as part of an investigation of the investigatory issue, the one or more user actions including user interactions with the user interface;

creating a record of the user activity involving the investigatory issue, the record including the one or more user actions; and linking the record of the user activity with the data object representing the investigative issue, the linking of the record of user activity with the data object including modifying the data object to include the record of user activity.

* * * * *